United States Patent
Kojima et al.

(10) Patent No.: US 7,966,280 B2
(45) Date of Patent: Jun. 21, 2011

(54) AUTOMOTIVE AIR CONDITIONER AND METHOD AND APPARATUS FOR CONTROLLING AUTOMOTIVE AIR CONDITIONER

(75) Inventors: Yasufumi Kojima, Gifu (JP); Hiroshi Takeda, Nagoya (JP); Kousuke Hara, Hachioji (JP)

(73) Assignee: Denso Corporation, Kariya (JP)

( * ) Notice: Subject to any disclaimer, the term of this patent is extended or adjusted under 35 U.S.C. 154(b) by 801 days.

(21) Appl. No.: 12/069,579

(22) Filed: Feb. 11, 2008

(65) Prior Publication Data
US 2008/0195564 A1 Aug. 14, 2008

(30) Foreign Application Priority Data
Feb. 13, 2007 (JP) ................................. 2007-032251

(51) Int. Cl.
G06F 15/00 (2006.01)
G06F 15/18 (2006.01)
G01M 1/38 (2006.01)
G05B 13/00 (2006.01)
G05B 15/00 (2006.01)
G05D 23/00 (2006.01)

(52) U.S. Cl. ......................................... 706/62; 700/276
(58) Field of Classification Search ..................... 706/62
See application file for complete search history.

(56) References Cited

U.S. PATENT DOCUMENTS

| | | | |
|---|---|---|---|
| 4,434,932 A | 3/1984 | Hara et al. | |
| 5,555,495 A | 9/1996 | Bell et al. | |
| 5,852,817 A * | 12/1998 | Kano | 706/23 |
| 6,064,958 A | 5/2000 | Takahashi et al. | |
| 6,435,417 B1 * | 8/2002 | Holdgrewe et al. | 236/46 R |
| 6,498,958 B1 | 12/2002 | Tateishi et al. | |
| 7,483,867 B2 * | 1/2009 | Ansari et al. | 706/25 |
| 2003/0127527 A1 | 7/2003 | Ichishi et al. | |
| 2003/0136854 A1 | 7/2003 | Aoki et al. | |
| 2003/0149675 A1 * | 8/2003 | Ansari et al. | 706/2 |
| 2004/0083013 A1 * | 4/2004 | Tolley | 700/47 |

(Continued)

FOREIGN PATENT DOCUMENTS

CN 1389675 1/2003

(Continued)

OTHER PUBLICATIONS

U.S. Appl. No. 11/901,946, filed Sep. 19, 2007.

(Continued)

Primary Examiner — Wilbert L. Starks, Jr.
Assistant Examiner — Vincent M Gonzales
(74) Attorney, Agent, or Firm — Harness, Dickey & Pierce, PLC

(57) ABSTRACT

An automotive air conditioner includes a storage unit which stores a plurality of pieces of state information as respective learned data; a learning unit which constructs a probabilistic model; a control information correcting unit which corrects setting information, etc., related to a vehicle occupant's setting operation in accordance with a calculated probability so as to achieve a specific setting operation; and an air-conditioning control unit which controls an air-conditioning unit in accordance with the corrected setting information, etc. The learning unit includes a clustering subunit for classifying the plurality of learned data into at least first and second clusters and for determining first and second ranges for the value of the state information from the learned data included in the respective clusters, and a probabilistic model constructing subunit for constructing the probabilistic model by determining the probabilities for the state information contained in the first and second ranges, respectively.

16 Claims, 11 Drawing Sheets

U.S. PATENT DOCUMENTS

| | | |
|---|---|---|
| 2004/0102151 A1 | 5/2004 | Shikata et al. |
| 2004/0199481 A1* | 10/2004 | Hartman et al. .............. 706/21 |
| 2006/0149544 A1 | 7/2006 | Hakkani-Tur et al. |
| 2006/0195483 A1 | 8/2006 | Heider et al. |
| 2007/0288413 A1 | 12/2007 | Mizuno et al. |

FOREIGN PATENT DOCUMENTS

| | | |
|---|---|---|
| CN | 1504354 | 6/2004 |
| DE | 44 26 732 | 2/1995 |
| DE | 698 12 525 | 4/1999 |
| DE | 698 11 814 | 8/1999 |
| DE | 100 03 548 | 8/2000 |
| DE | 199 02 201 A1 | 8/2000 |
| DE | 199 04 143 | 8/2000 |
| DE | 102 02 928 | 7/2003 |
| DE | 103 33 181 | 5/2005 |
| DE | 103 50 715 | 6/2005 |
| JP | 5-169963 | 7/1993 |
| JP | 5-208610 | 8/1993 |
| JP | 08-271026 | 10/1996 |
| JP | 2000-062431 | 2/2000 |
| JP | 2000-071060 | 3/2000 |
| JP | 2000-293204 | 10/2000 |
| JP | 2002-507793 | 3/2002 |
| JP | 2003-220816 | 8/2003 |
| JP | 2005-257270 | 9/2005 |
| JP | 2006-240387 | 9/2006 |
| WO | WO2005/047062 | 5/2005 |
| WO | WO 2005/091214 | 9/2005 |

OTHER PUBLICATIONS

Office action dated Sep. 21, 2010 in related German Application No. 070452316 and English translation.

Adams, Douglas,"Per Anhalter durch die Galaxis", novel, 14$^{th}$ edn., reprint of UB31070, Frankfurt am Main; Berlin, Ullstein, 1990, chapter 10, pp. 83-84, ISBN 3-548-22491-1 (English translation of the relevant part).

Office action dated Sep. 25, 2009 in related Chinese Application No. 2008 10131658.0.

Office Action dated Oct. 29, 2010, for corresponding German Application No. 10 2008 007 725.9, and English translation thereof.

Richard O. Duda et al, "Pattern Classification", Second Edition, John Wiley & Sons, Inc., 2001, pp. 56-64.

Y. Motomura and H. Iwasaki, "Technology of Bayesian Networks", Tokyo Denki University Press, Jul. 2006, pp. 9-26.

K. Shigemasu et al, "Overview of Bayesian Networks", Baifukan, Jul. 2006, pp. 4-7, 35-38, 54-63, 74-81, 85-87, and 102-110.

Office action dated Dec. 2, 2008 in Japanese Application No. 2007/032251.

Office Action from corresponding German Patent Application No. 10 2008 008 446.8 dated Dec. 20, 2010 with English translation.

Office Action dated Mar. 29, 2011 in corresponding Japanese Application No. 2006-260699.

* cited by examiner

Fig.5A

| DAY OF WEEK: $x_1$ | | P($x_1$) |
|---|---|---|
| | SATURDAY ($x_1$=1) | 0.143 |
| | OTHER THAN SATURDAY ($x_1$=0) | 0.857 |

Fig.5B

| TIME SEGMENT: $x_2$ | | P($x_2$) |
|---|---|---|
| | DAYTIME ($x_2$=1) | 0.5 |
| | NIGHTTIME ($x_2$=0) | 0.5 |

Fig.5C

| CURRENT LOCATION: $x_3$ | | P($x_3$) |
|---|---|---|
| | PARK ($x_3$=1) | 0.15 |
| | OTHER THAN PARK ($x_3$=0) | 0.85 |

Fig.5D

| ($x_1, x_2, x_3$) | P($x_4|x_1, x_2, x_3$) |
|---|---|
| (0,0,0) | 0.1 |
| (1,0,0) | 0.2 |
| (0,1,0) | 0.4 |
| (0,0,1) | 0.3 |
| (1,1,0) | 0.55 |
| (1,0,1) | 0.15 |
| (0,1,1) | 0.7 |
| (1,1,1) | 0.95 |

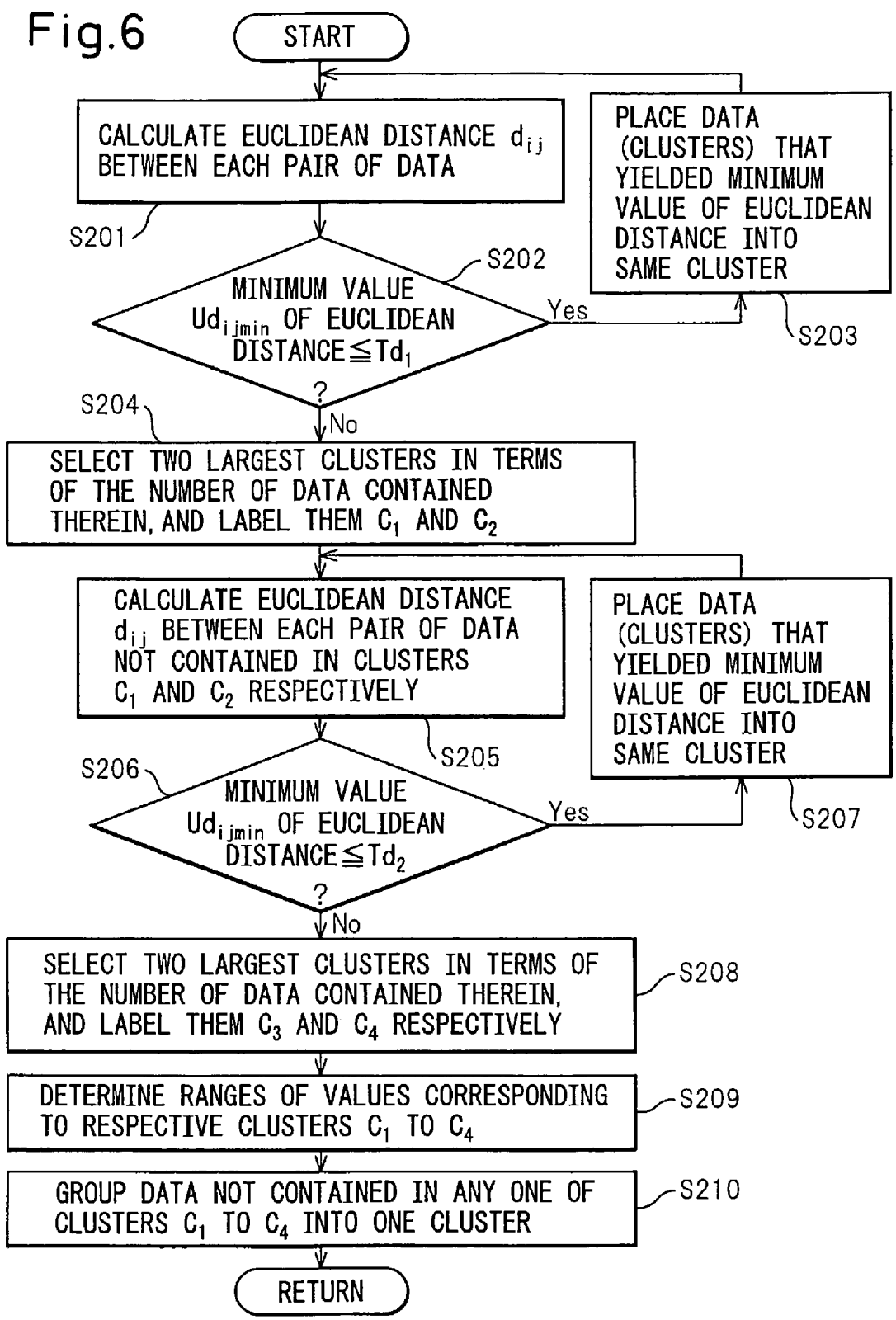

Fig.7

| CURRENT LOCATION | DISTRIBUTION RANGE | NUMBER OF DATA | CLUSTER No. |
|---|---|---|---|
| NATIONAL ROAD (NEAR HOME) | WIDE (WITHIN 3km) | 6 | $C_4$ |
| NATIONAL ROAD (NEAR COMPANY) | WIDE | 8 | $C_3$ |
| COMPANY PARKING LOT | NARROW (WITHIN 300m) | 6 | $C_1$ |
| FITNESS CLUB PARKING LOT | NARROW | 5 | $C_2$ |
| PARKING LOT OF NEARBY SUPERMARKET | NARROW | 4 | $C_5$ |
| HOME GARAGE | NARROW | 1 | |

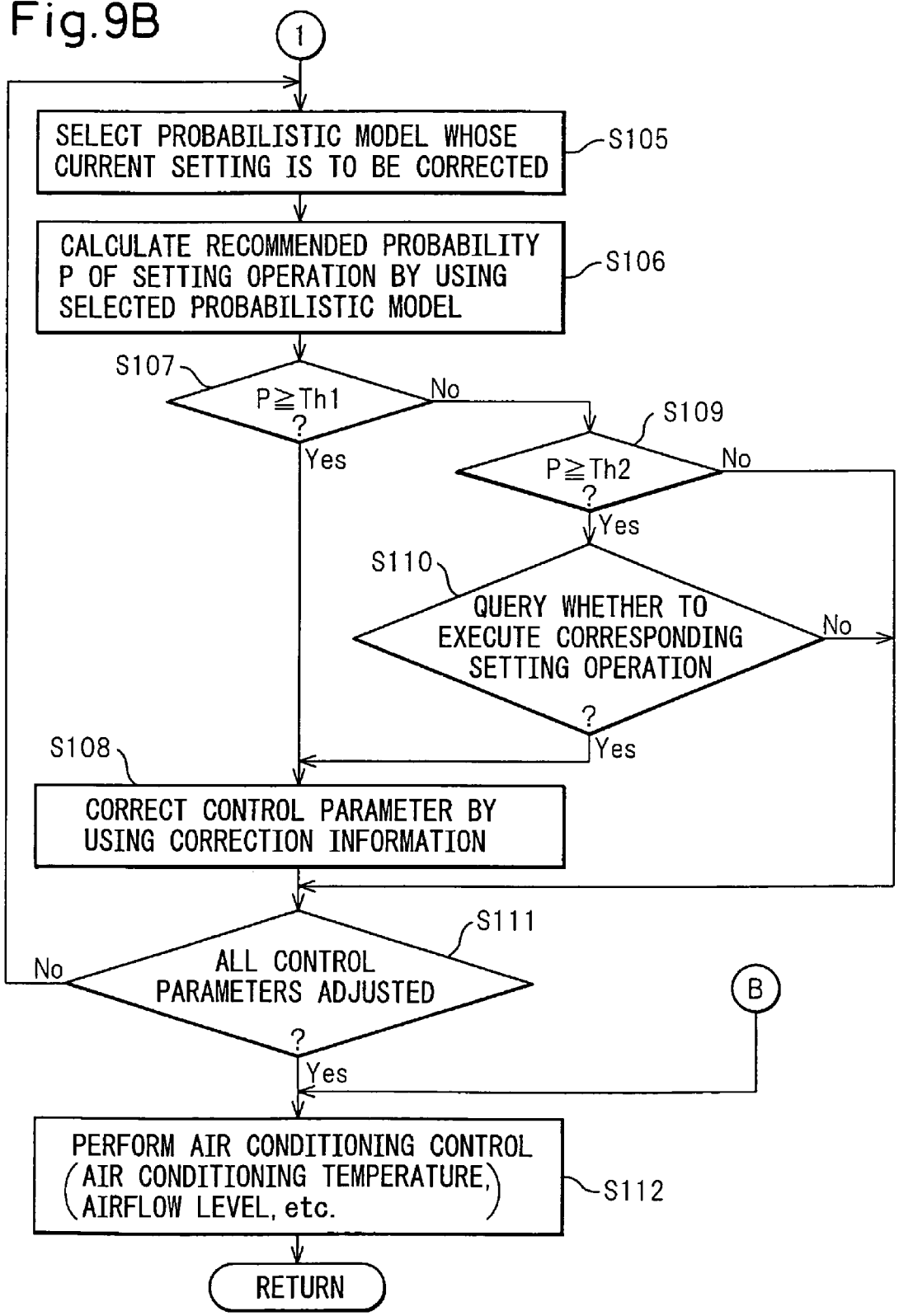

AUTOMOTIVE AIR CONDITIONER AND METHOD AND APPARATUS FOR CONTROLLING AUTOMOTIVE AIR CONDITIONER

FIELD OF THE INVENTION

The present invention relates to an automotive air conditioner and a method and apparatus for controlling the automotive air conditioner, and more particularly to an automotive air conditioner that optimizes air conditioning state to match a vehicle occupant's sensitivity to temperature or to suit specific situations, and a method for controlling such an automotive air conditioner.

BACKGROUND OF THE INVENTION

Generally, an automotive air conditioner automatically determines the temperature, airflow level, etc., of conditioned air discharged from selected air outlets by reference to various parameters such as temperature setting, outside temperature, inside temperature, and solar radiation. However, human sensitivity to temperature differs from one person to another (some are sensitive to heat, while others are sensitive to cold). As a result, the automatically determined temperature, airflow level, etc., of the conditioned air may not be optimum for every occupant. In that case, an occupant may adjust the air conditioner to raise or lower the temperature setting or to increase or reduce the airflow level by operating the operation panel. In view of this, an air conditioner has been developed that incorporates a learning control that corrects a relational equation for determining the temperature, airflow level, etc., of conditioned air by using relevant parameters when an occupant has changed the setting such as the temperature setting or airflow level by operating an operation panel (refer to Japanese Unexamined Patent Publication No. 2000-293204).

However, it should, be noted that a vehicle occupant does not always change the setting of the air conditioner because his or her sensitivity to temperature differs from others. The occupant may change the setting due to external environmental factors. For example, if the occupant has just exercised before driving the vehicle, the occupant may want to set the temperature lower than normal. Further, when the vehicle approaches a place where traffic congestion always occurs, the occupant may set the air conditioner to an inside air recirculation mode in order to prevent exhaust gas from flowing into the inside of the vehicle. However, the air conditioner disclosed in Japanese Unexamined Patent Publication No. 2000-293204 cannot distinguish between the case where the occupant has changed the setting of the air conditioner because of or external environmental factors a situation in which the occupant has changed the setting because the set value automatically adjusted by the air conditioner did not match the occupant's sensitivity to temperature.

On the other hand, an automotive climate control system has been developed wherein provisions have been made in order to discriminate between temperature control learning and other learning by adding data indicating the current location of a vehicle to the learned data (refer to Japanese Unexamined Patent Publication No. 2000-62431).

However, the automotive climate control system disclosed in Japanese Unexamined Patent Publication No. 2000-62431 is the type that determines whether the temperature control learning is to be performed or not by referring to the date and time and the location of the vehicle, and cannot address situations where the air conditioner setting has been changed for reasons other than the date and time or the location of the vehicle, for example, when an occupant has lowered the temperature setting because he or she has been doing physical exercise. Furthermore, the automotive climate control system does not optimize the air conditioning temperature, etc., to suit specific situations such as described above.

If the air conditioning temperature, etc., are to be optimized to suit specific situations, each specific situation must be accurately identified. For this purpose, in the case of the automotive climate control system disclosed in Japanese Unexamined Patent Publication No. 2000-62431, for example, it is necessary to determine the range of the date and time and the range of the location of the vehicle where the temperature control learning is to be performed. However, it has been difficult to set such ranges in advance because the range of the date and time and the range of the location of the vehicle vary depending on the vehicle driver.

SUMMARY OF THE INVENTION

It is an object of the present invention to provide an automotive air conditioner that can accurately determine the range of each information value to match each specific situation that requires adjusting the setting of the air conditioner, and a method for controlling such an air conditioner.

It is another object of the present invention to provide an automotive air conditioner that can automatically learn an optimum air conditioner setting that matches an occupant's sensitivity to temperature or that suits each specific situation, and a method for controlling such an air conditioner.

According to one aspect of the present invention, there is provided an automotive air conditioner. The automotive air conditioner includes an information acquiring unit which acquires state information; a storage unit which stores a plurality of pieces of state information as respective learned data; a learning unit which, by using the learned data, constructs a probabilistic model into which the state information is entered in order to calculate the probability of a vehicle occupant performing a specific setting operation; a control information correcting unit which calculates the probability of the occupant performing the specific setting operation by entering the state information into the probabilistic model constructed by the learning unit, and corrects setting information or control information related to the setting operation of the occupant in accordance with the calculated probability so as to achieve the specific setting operation; and an air-conditioning control unit which controls an air-conditioning unit in accordance with the corrected setting information or control information. In the automotive air conditioner, the learning unit includes a clustering subunit which classifies the plurality of learned data stored in the storage unit into at least a first cluster and a second cluster, and which determines a first range for a value of the state information from the learned data included in the first cluster and a second range for the value of the state information from the learned data included in the second cluster; and a probabilistic model constructing subunit which constructs the probabilistic model associated with the specific setting operation by determining the probability of occurrence of the value of the state information contained in the first range and the probability of occurrence of the value of the state information contained in the second range.

Since the automotive air conditioner with the above configuration optimally determines the range of the state information value representing the vehicle state, air conditioning state, etc. corresponding to a specific situation and, based on the result, constructs the probabilistic model for calculating the probability, the air conditioner setting that accurately matches the specific situation can be automatically accomplished. Here, the specific setting operation refers to the operation for changing the operation state of the air conditioner, such as changing the temperature setting or airflow level setting, setting the air conditioner to the inside air recirculation mode, or activating or deactivating the defroster. The setting information refers to the information for regulating the operation of the automotive air conditioner, such as temperature setting, airflow level, inside/outside air intake ratio, airflow ratio of conditioned air between various air outlets, etc. Further, the control information refers to the information that is determined based on the setting information and used to control the operation of the various parts of the air-conditioning unit, such as the temperature of the conditioned air, the number of revolutions of the blower fan, and the opening of the air mix door.

Preferably, the clustering subunit has a first clustering condition and a second clustering condition that define different ranges for the value of the state information, and generates clusters after determining the ranges of the clusters to which the respective learned data belong, by using the plurality of learned data and the first and second clustering conditions.

Preferably, the ranges for the value of the state information are each determined based on a Euclidean distance, the first clustering condition is that the Euclidean distance between each pair of learned data in the plurality of learned data is not greater than a first Euclidean distance, and the second clustering condition is that the Euclidean distance between each pair of learned data in the plurality of learned data is greater than the first Euclidean distance, but not greater than a second Euclidean distance.

With the above arrangement, since the state information corresponding to the specific situation can be classified into clusters not only when the information is distributed over a relatively narrow range but also when the information is distributed over a relatively wide range, the automotive air conditioner can accurately determine the ranges of the state information value.

Preferably, the clustering subunit determines the first range so as to contain all of the learned data included in the first cluster but not to contain any learned data included in the second cluster, and determines the second range so as to contain all of the learned data included in the second cluster but not to contain any learned data included in the first cluster.

Preferably, the clustering subunit determines the first range for the value of the state information so as to be defined by an area whose center is located at the centroid of the learned data included in the first cluster and whose radius is defined by the Euclidean distance from the centroid to the learned data located farthest away therefrom among the learned data included in the first cluster.

Preferably, when the probabilistic model has a node that takes the state information as an input and that outputs the probability of the occupant performing the specific setting operation, and the node has a conditional probability table that indicates the probability for the case where the value of the state information is contained in the first range as well as for the case where the value of the state information is contained in the second range, the probabilistic model constructing subunit obtains from the plurality of learned data the number of times that the specific setting operation has been performed for the case where the value of the state information is contained in the first range as well as for the case where the value of the state information is contained in the second range, and creates the conditional probability table by dividing the number of times by the total number of the plurality of learned data and thereby obtaining the probability for the case where the value of the state information is contained in the first range as well as for the case where the value of the state information is contained in the second range.

Preferably, in an alternative mode of the invention, the probabilistic model has a group of nodes consisting of a node that takes the state information as an input and that outputs a conditional probability of a specific event and at least one other node that takes the output of the node as an input and that outputs the probability of the occupant performing the specific setting operation, and the node has a conditional probability table that indicates the conditional probability for the case where the value of the state information is contained in the first range as well as for the case where the value of the state information is contained in the second range, wherein the probabilistic model constructing subunit obtains from the plurality of learned data the number of times that the specific even has occurred for the case where the value of the state information is contained in the first range as well as for the case where the value of the state information is contained in the second range, and creates the conditional probability table by dividing the number of times by the total number of the plurality of learned data and thereby obtaining the conditional probability for the case where the value of the state information is contained in the first range as well as for the case where the value of the state information is contained in the second range.

The specific event refers to a specific situation concerning the setting, operation, etc. of the automotive air conditioner or the state, behavior, etc. of the vehicle, in which the airflow level, airflow direction, temperature setting, window open/closed state, throttle opening, or vehicle speed, for example, is set to a specified value.

Preferably, the state information is the vehicle's current location information, time information indicating the current time, or a combination of the location information and the time information. The current location refers to the vehicle's location at the time that its location information is acquired by the information acquiring unit, and the current time refers to the time of day at the time that the information is acquired by the information acquiring unit.

According to another aspect of the present invention, there is provided a method for controlling an automotive air conditioner, the air conditioner including an air-conditioning unit which supplies conditioned air into a vehicle, an information acquiring unit which acquires state information, a storage unit, a control information correcting unit which has at least one probabilistic model associated with a specific setting operation, calculates the probability of a vehicle occupant performing the specific operation by entering the state information into the probabilistic model, and corrects setting information or control information related to the setting operation of the occupant in accordance with the calculated probability so as to achieve the specific setting operation, and an air-conditioning control unit which controls the air-conditioning unit in accordance with the corrected setting information or control information. The control method includes storing the state information as learned information in the storage unit; selecting a plurality of learned data from the learned data stored in the storage unit; classifying the selected plurality of learned data into at least a first cluster and a second cluster, and determining a first range for a value of the state information from the learned data included in the first cluster and a second range for the value of the state information from the learned data included in the second cluster; and constructing the probabilistic model associated with the specific setting operation by determining the probability of occurrence of the state information contained in the first range and the probability of occurrence of the state information contained in the second range.

Preferably, in the control method of the invention, each time the specific setting operation is performed, the storing the state information stores the state information in the storage unit as the learned data related to the specific setting operation. With this arrangement, the state information can be stored reliably as the operator performs the specific operation.

Preferably, in the control method of the invention, when the number of times that the specific setting operation has been performed reaches a predetermined number of times, the selecting a plurality of learned data selects the plurality of learned data related to the specific setting operation. Alternatively, when a predetermined time period has elapsed after the construction of the probabilistic model associated with the specific setting operation, the selecting a plurality of learned data selects the plurality of learned data related to the specific setting operation in order to construct another probabilistic model associated with the specific setting operation. With this arrangement, the probabilistic model can be constructed using a sufficient number of learned data.

Preferably, the classifying the selected plurality of learned data generates the clusters after determining the ranges of the clusters to which the respective learned data belong by using the plurality of learned data and also using a first clustering condition and a second clustering condition that define different ranges for the value of the state information.

Preferably, the ranges for the value of the state information are each determined based on a Euclidean distance, the first clustering condition is that the Euclidean distance between each pair of learned data in the plurality of learned data is not greater than a first Euclidean distance, and the second clustering condition is that the Euclidean distance between each pair of learned data in the plurality of learned data is greater than the first Euclidean distance but not greater than a second Euclidean distance.

According to still another aspect of the present invention, there is provided a controller. The controller includes an information acquiring unit which acquires state information of an apparatus to be controlled; a storage unit which stores a plurality of pieces of state information as respective learned data; a learning unit which, by using the learned data, constructs a probabilistic model into which the state information is entered in order to calculate the probability of performing a specific setting operation; a control information correcting unit which calculates the probability of the specific operation by entering the state information into the probabilistic model constructed by the learning unit, and corrects setting information or control information related to the specific setting operation in accordance with the calculated probability so as to achieve the specific setting operation; and a control unit which controls the apparatus in accordance with the corrected setting information or control information. In the controller, the learning unit includes a clustering subunit which classifies the plurality of learned data stored in the storage unit into at least a first cluster and a second cluster, and which determines a first range for a value of the state information from the learned data included in the first cluster and a second range for the value of the state information from the learned data included in the second cluster; and a probabilistic model constructing subunit which constructs the probabilistic model associated with the specific setting operation by determining the probability of occurrence of the state information contained in the first range and the probability of occurrence of the state information contained in the second range.

Preferably, the state information is location information indicating current location of the apparatus to be controlled, and the clustering unit classifies the plurality of learned data in such a manner that the learned data whose distance relative to each other is not greater than a first distance are classified as belonging to the first cluster and the learned data whose distance relative to each other is greater than the first distance but not greater than a second distance are classified as belonging to the second cluster, and determines the first range for the value of the state information so as to be defined by a circular area whose center is located at the centroid of the learned data included in the first cluster and whose radius is defined by the distance from the centroid to the learned data located farthest away therefrom among the learned data included in the first cluster, while determining the second range for the value of the state information so as to be defined by a circular area whose center is located at the centroid of the learned data included in the second cluster and whose radius is defined by the distance from the centroid to the learned data located farthest away therefrom among the learned data included in the second cluster.

Preferably, in an alternative mode of the invention, the state information is time information indicating the time of day acquired by the information acquiring unit, and the clustering unit classifies the plurality of learned data in such a manner that the learned data whose time difference relative to each other is not greater than a first period are classified as belonging to the first cluster and the learned data whose time difference relative to each other is greater than the first period but not greater than a second period are classified as belonging to the second cluster, and determines the first range for the value of the state information so as to be bounded at one end by the earliest occurring learned data and at the other end by the latest occurring learned data among the learned data included in the first cluster, while determining the second range for the value of the state information so as to be bounded at one end by the earliest occurring learned data and at the other end by the latest occurring learned data among the learned data included in the second cluster.

DESCRIPTION OF THE DRAWINGS

These and other features and advantages of the present invention will be better understood by reading the following detailed description, taken together with the drawings wherein:

FIGS. 5A to 5D are diagrams showing conditional probability tables for the nodes of the probabilistic model shown in FIG. 4;

FIG. 6 is a flowchart showing a learned information clustering procedure of the automotive air conditioner according to the embodiment of the present invention;

FIG. 7 is a diagram showing one example of the distribution of current locations where a specific setting operation is performed;

FIGS. 9A and 9B are flowcharts showing the control operation of the automotive air conditioner according to the embodiment of the present invention.

DETAILED DESCRIPTION OF THE PREFERRED EMBODIMENT

An automotive air conditioner according to the present invention will be described below with reference to the drawings. However, it should be noted that the present invention is not limited by the description given herein, but embraces the inventions described in the appended claims and their equivalents.

An automotive air conditioner according to an embodiment of the present invention will be described below.

The automotive air conditioner according to the embodiment of the present invention estimates the air conditioner setting operation to be performed by a vehicle occupant, based on at least one probabilistic model that has been learned in accordance with the occupant's sensitivity to temperature or with a specific situation, and automatically executes the air conditioner setting. More particularly, in generating the probabilistic model, the automotive air conditioner optimally determines the range of the value of the state information representing the vehicle state, air conditioning state, etc. corresponding to the specific situation and, based on the result, constructs the probabilistic model for calculating the probability; accordingly, the air conditioner setting that accurately matches the specific situation can be automatically accomplished.

Figure 1:
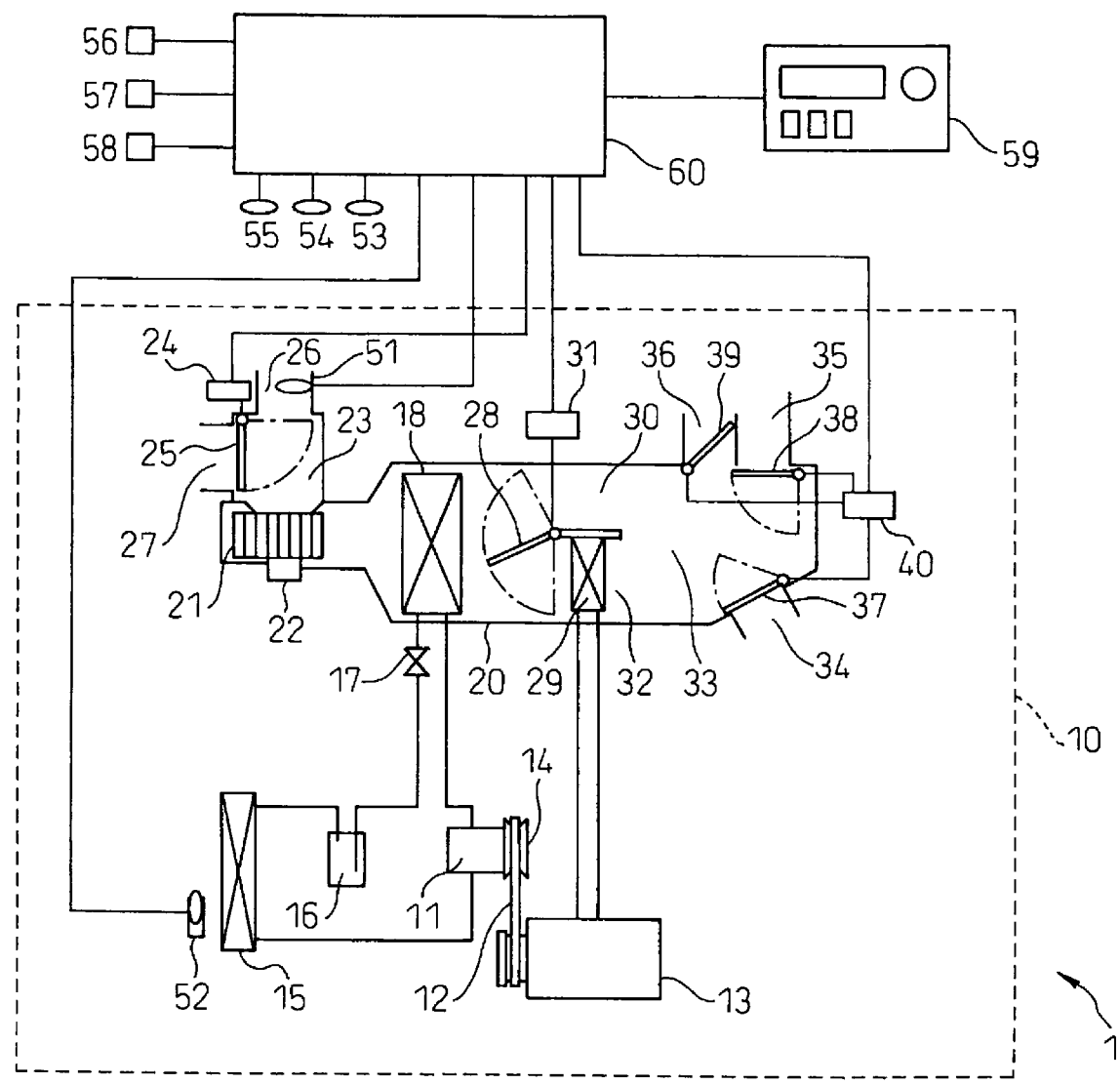
FIG. 1 is a diagram showing the general configuration of an automotive air conditioner according to an embodiment of the present invention.

FIG. 1 is a diagram showing the general configuration of the automotive air conditioner 1 according to the embodiment of the present invention. As shown in FIG. 1, the automotive air conditioner 1 includes an air-conditioning unit 10 comprised mainly of mechanical components, and a controller 60 for controlling the air-conditioning unit 10.

First, the structure of the refrigeration cycle R of the air-conditioning unit 10 will be described. The refrigeration cycle R of the automotive air conditioner 1 is constructed from a closed circuit, which comprises a compressor 11, a condenser 15, a receiver 16, an expansion valve 17, and an evaporator 18 arranged in this order in a clockwise direction. The compressor 11 compresses refrigerant and changes it into a high-pressure gas. The compressor 11 is equipped with an electromagnetic clutch 14 for connecting and disconnecting the power being transmitted from an automotive engine 13 via a belt 12. The condenser 15 cools the high-temperature, high-pressure refrigerant gas discharged from the compressor 11 and changes it into a liquid. The receiver 16 stores the liquid refrigerant. To prevent the cooling performance from dropping, the receiver 16 removes gas bubbles contained in the liquid refrigerant, and supplies only the completely liquefied refrigerant to the expansion valve 17. The expansion valve 17 causes the liquid refrigerant to undergo adiabatic expansion and thereby changes it into a low-temperature, low-pressure refrigerant which flows into the evaporator 18. The evaporator 18 performs heat exchange between the low-temperature, low-pressure refrigerant and the air forced to flow over the evaporator 18 which thus cools the air.

Next, the structure inside an air conditioning housing 20 in the air-conditioning unit 10 will be described. A blower fan 21 is located on the upstream side of the evaporator 18. The blower fan is a centrifugal blower fan which is driven by a drive motor 22. An inside/outside air switching box 23 is located on the suction side of the blower fan 21. An inside/outside air switching door 25, which is driven by an inside/outside air servo motor 24, is mounted inside the inside/outside air switching box 23. The inside/outside air switching door 25 is operated between an inside air inlet 26 and an outside air inlet 27. The air drawn through the inside air inlet 26 or the outside air inlet 27 passes through the inside/outside air switching box 23 and is delivered by the blower fan 21 to the evaporator 18. Here, the amount of air to be delivered from the automotive air conditioner 1 can be adjusted by regulating the rotational speed of the blower fan 21.

An air mix door 28 and a heater core 29 are arranged in this order on the downstream side of the evaporator 18. Coolant used to cool the automotive engine 13 is circulated passing through the heater core 29 in order to heat the air passing over the heater core 29. A bypass passage 30 that bypasses the heater core 29 is formed inside the air conditioning housing 20. The air mix door 28 is turned by a temperature control servo motor 31 and adjusts the airflow ratio between the hot air passing through a passage 32 over the heater core 29 and the cold air passing through the bypass passage 30 so that the air controlled to the desired temperature is discharged from the air outlets.

A foot-level outlet 34, a face-level outlet 35, and a defroster outlet 36 through which the conditioned air is blown into the passenger compartment are provided on the downstream side of an air mixing section 33 where the cold air passed through the bypass passage 30 and the hot air passed through the passage 32 over the heater core 29 are mixed together. A foot-level door 37, a face-level door 38, and a defroster door 39 for opening and closing the respective outlets are provided on the respective outlets. The foot-level outlet 34 is for blowing the conditioned air to the foot level of the driver's seat or the passenger seat. The face-level outlet 35 is for blowing the conditioned air toward the driver's seat or the passenger seat from the front panel. On the other hand, the defroster outlet 36 is for blowing the conditioned air toward the windshield. The doors 37, 38, and 39 are driven by a mode servo motor 40.

Next, a description will be given of various sensors that together function as an information acquiring unit in the automotive air conditioner 1. An inside temperature sensor 51 is mounted together with an aspirator in the instrument panel or the like at a position near the steering wheel in order to measure temperature $T_r$ inside the passenger compartment. An outside temperature sensor 52 is mounted in the radiator grille on the front side of the condenser 15 at the front end of the vehicle in order to measure temperature $T_{am}$ outside the vehicle passenger compartment. Further, a solar sensor 53 is mounted inside the passenger compartment at a position near the windshield in order to measure the intensity of solar radiation S entering the passenger compartment. The solar sensor 53 comprises a photodiode or the like. The inside temperature $T_r$, the outside temperature $T_{am}$, and the amount of solar radiation S measured by these sensors are used as air conditioning information in the controller 60 to perform temperature control and airflow level control. The details of the temperature control and airflow level control will be described later.

Also provided are sensors such as an evaporator outlet temperature sensor for measuring the temperature of the air (evaporator outlet temperature) leaving the evaporator 18, a heater inlet coolant temperature sensor for measuring the temperature of the engine coolant flowing into the heater core 29, and a pressure sensor for measuring the refrigerant circulating through the refrigeration cycle R. In addition, one or more in-car cameras 54 for shooting the faces of the occupants seated in the driver's seat and other seats are mounted inside the passenger compartment. Further, an outside camera 55 is mounted for viewing outside the vehicle.

The automotive air conditioner 1 acquires sensing information from each of the above described sensors. Further, the automotive air conditioner 1 acquires location information, such as the current location of the vehicle, the heading direction of the vehicle, neighborhood area information, and Gbook information, from a navigation system 56. In addition, the automotive air conditioner 1 acquires various kinds of operation information, such as throttle opening, steering wheel angle, brake pedal position, power window opening, and wiper, turn signal, or car audio ON/OFF state, as well as vehicle speed and vehicle behavior information, from vehicle operation apparatus 57. The automotive air conditioner 1 further acquires time information such as the current date and time from a vehicle-mounted clock 58. Further, an electrocardiographic detection sensor, a heartbeat/respiration sensor, a body temperature sensor, a skin temperature sensor, and the like may be mounted in the driver's seat, etc. so that the automotive air conditioner 1 can acquire physiological information concerning the occupant.

In this way, the navigation system 56, the vehicle operation apparatus 57, and the vehicle-mounted clock 58 also function as an information acquiring unit.

Figure 2:
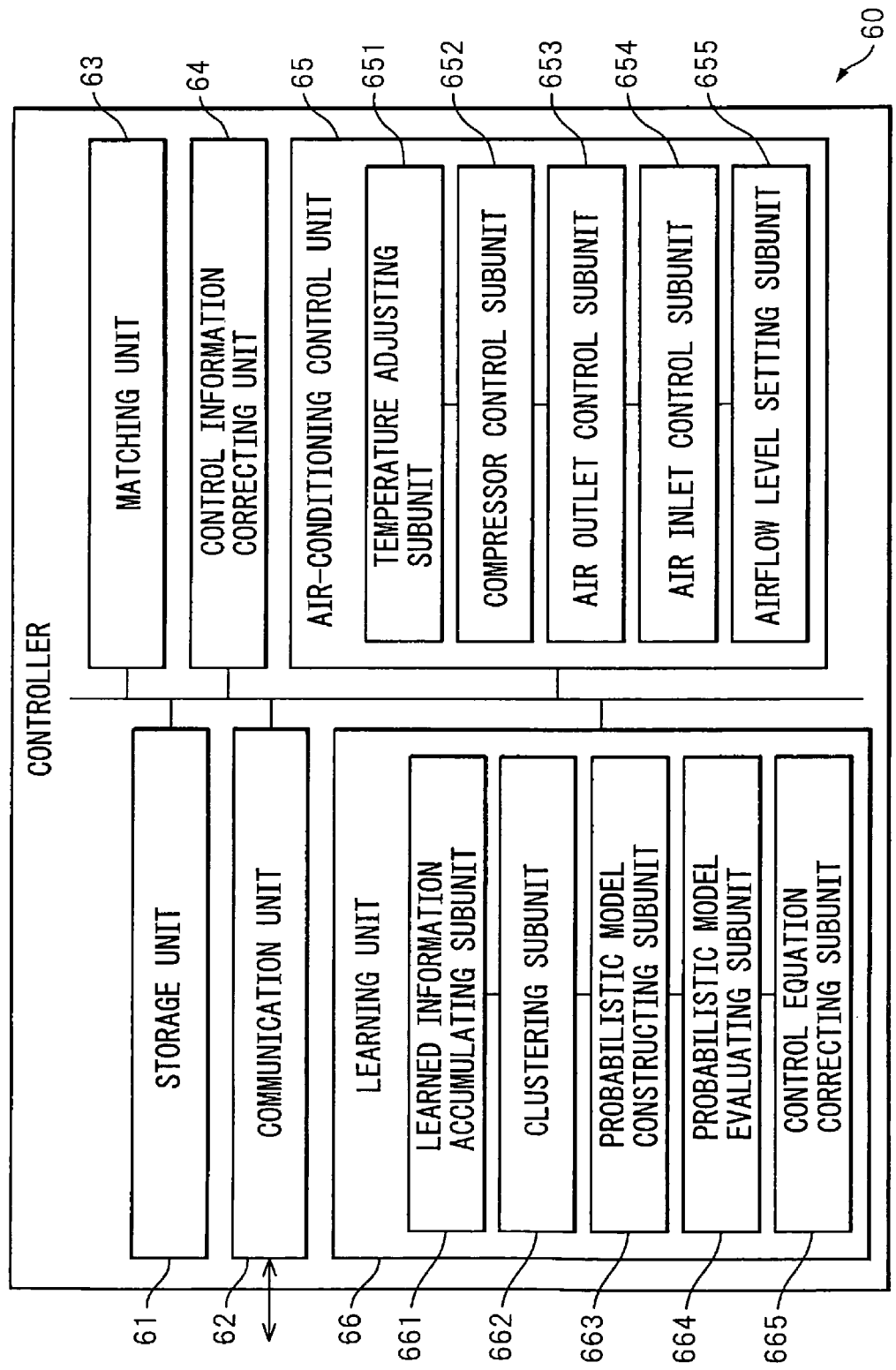
FIG. 2 is a functional block diagram of a controller in the automotive air conditioner.

FIG. 2 is a functional block diagram of the controller 60 in the automotive air conditioner 1.

The controller 60 includes: one or more microcomputers not shown, each comprising a CPU, ROM, RAM, etc., and their peripheral circuits; a storage unit 61 constructed from an electrically alterable nonvolatile memory or the like; and a communication unit 62 for performing communications with the various sensors, the navigation system 56, the vehicle operation apparatus 57, etc. in compliance with an automotive communication standard such as Control Area Network (CAN).

The controller 60 further includes a matching unit 63, a control information correcting unit 64, an air-conditioning control unit 65, and a learning unit 66, each implemented as a functional module by the microcomputer or by a computer program executed on the microcomputer.

The controller 60 stores state information, such as the sensing information, the location information, and the vehicle behavior information, acquired from the various sensors, the navigation system, the vehicle operation apparatus, etc., temporarily into the RAM. The controller 60 also stores operation signals acquired from the A/C operation panel 59 temporarily into the RAM. Then, the controller 60 controls the air-conditioning unit 10 based on the state information and the operation signals. For example, the controller 60 controls the electromagnetic clutch 14 to turn the compressor 11 on and off, or controls the drive motor 22 to regulate the rotational speed of the blower fan 21. Further, the controller 60 adjusts the openings of the various doors by controlling the inside/outside air servo motor 24, the temperature control servo motor 31, and the mode servo motor 40. By performing these control operations, the controller 60 adjusts the ratio of the conditioned air between the various air outlets, the total amount of air, and the temperature of the conditioned air so that the temperature inside the passenger compartment is brought as close as possible to the temperature set by the occupant. Here, to determine the temperature, airflow level, etc. of the conditioned air, the controller 60 enters prescribed state information into an applicable probabilistic model and estimates the probability that the occupant performs a specific operation (for example, to lower the temperature setting, set the airflow level to maximum, set the air conditioner to the inside air recirculation mode, etc.). If the probability is greater than a predetermined threshold value, the controller 60 automatically executes that specific operation.

The controller 60 stores the state information, etc., at periodic intervals of time. Alternatively, each time the occupant operates the automotive air conditioner 1, the controller 60 stores the kind of the operation performed and the various kinds of information obtained at the time of the operation. When such information has been stored a predetermined number of times, the controller 60 generates a probabilistic model through statistical learning. Alternatively, the controller 60 corrects the control equation used for the temperature control operation. The functional modules for performing the above operations will be described below.

When the engine switch is turned on, the matching unit 63 performs the matching and authentication of the occupant based on the image captured by the in-car camera 54 and on the matching information concerning the registered users preregistered in the automotive air conditioner 1, and determines whether the occupant matches any one of the registered users. When a registered user is found that matches the occupant, the matching unit 63 retrieves the identification information (ID) of the matching registered user and the personal information associated with that registered user from the storage unit 61.

Here, the matching unit 63 performs the matching and authentication of the occupant, for example, in accordance with the following method. The matching unit 63 binarizes the image captured by the in-car camera 54 and detects edges in the image to discriminate a region corresponding to the face of the occupant. Then, the matching unit 63 detects features such as eyes, nose, lips, etc., in the thus discriminated face region by such means as edge detection, and extracts a set of feature amounts representing the sizes of the features, their positional relationships relative to each other, etc. Next, the matching unit 63 compares the set of the extracted feature amounts against the sets of feature amounts obtained from the registered users and stored in advance in the storage unit 61, and computes the degree of matching by using, for example, a correlation computation method. If the highest degree of matching thus obtained is greater than a predetermined threshold value, the matching unit 63 authenticates the occupant as matching the registered user that yielded the highest degree of matching. The above matching method is only one example, and it will be appreciated that the matching unit 63 can perform the matching and authentication of the occupant by using other known matching methods. For example, the matching unit 63 can use a face authentication system proposed in Japanese Unexamined Patent Publication No. 2005-202786 for automotive applications. The matching unit 63 can also use methods other than image authentication. For example, the matching unit 63 may be configured to perform the matching and authentication of the occupant by using a smart key system. Furthermore, the matching and authentication of the occupant may be performed by combining a smart key system with image authentication, as in the vehicle theft prevention device disclosed in Japanese Unexamined Patent Publication No. 2005-67353. Further, the matching unit 63 may use a sensor for reading a palm or finger vein pattern or a fingerprint for authentication of the occupant.

The control information correcting unit 64 determines whether the setting parameter of the air conditioner 1, i.e., the occupant-settable setting information such as the set temperature $T_{set}$, airflow level W, or inside air recirculation mode/outside air inlet mode setting, should be automatically adjusted based on the probabilistic model. More specifically, the control information correcting unit 64 has at least one probabilistic model associated with a specific setting operation, calculates the probability of the specific setting operation by entering the state information into the probabilistic model, and corrects the setting information or control information related to the specific setting operation based on the calculated probability and on the correction information associated with the probabilistic model. Here, the correction information associated with the probabilistic model refers to the value of the setting information or control information after correction in the correction defined by the probabilistic model or to the amount of correction to be added to or by which to multiply the setting information or control information in order to correct the setting information or control information to the desired value.

In the present embodiment, a Bayesian network is used as the probabilistic model. A Bayesian network models probabilistic causality relationships among a plurality of events. Further, a Bayesian network is a network represented by a directed acyclic graph in which propagation between each node is obtained by a conditional probability. For the details of Bayesian networks, refer to "Bayesian Network Technology" by Yoichi Kimura and Hirotoshi Iwasaki, 1st Edition, Tokyo Denki University Press, July 2006, "Introduction to Bayesian Networks" by Kazuo Shigemasu et al., 1st Edition, Baifukan, July 2006, or "Pattern Recognition" translated by Morio Onoe, 1st Edition, Shin Gijutsu Communications, July 2001.

In the present embodiment, the probabilistic model is generated for each user registered in the automotive air conditioner 1. Further, the probabilistic model is generated for each kind of setting operation (for example, lower or raise the set temperature $T_{set}$, adjust the airflow level W, set the air conditioner to the inside air recirculation mode, etc.). The structural information of each probabilistic model is stored in the storage unit 61 by being associated with the user information and setting operation. More specifically, the graph structure showing the connections between the nodes forming the probabilistic model, the type of input information given to the input node, and the conditional probability table (CPT) of each node are defined for each probabilistic model and stored in the storage unit 61. Further, the user identification number (ID), the setting operation number k that uniquely corresponds to the kind of setting operation, and the setting parameter to be corrected by the setting operation and its correction value (for example, $(T_{set}, -3)$ when lowering the set temperature $T_{set}$ by 3° C., $(W, W_{max})$ when setting the air flow level W to maximum $W_{max}$, etc.) are also defined for each probabilistic model and stored in the storage unit 61 by being associated with the probabilistic model.

The control information correcting unit 64 retrieves from the storage unit 61 one or more probabilistic models associated with the registered user identified by the matching unit 63 as matching the occupant. The control information correcting unit 64 enters prescribed state information into each of the retrieved probabilistic models and obtains the probability that the occupant performs the setting operation associated with the probabilistic model. More specifically, the control information correcting unit 64 obtains the probability that the setting operation uniquely identified in relation to the probabilistic model and designated by the setting operation number k stored in the storage unit 61 together with that probabilistic model is performed. The probability can be obtained by using, for example, a belief propagation method. When the thus obtained probability is greater than or equal to a first threshold value Th1 (for example, Th1=0.9) (this means that it is almost certain that the occupant will perform that setting operation), the control information correcting unit 64 automatically executes that setting operation. More specifically, the control information correcting unit 64 corrects the value of the setting parameter of that setting operation by using the correction value of the setting parameter associated with the probabilistic model, that is, the correction value of the setting parameter uniquely defined in relation to the probabilistic model and stored in the storage unit 61 together with that probabilistic model.

On the other hand, when the obtained probability is smaller than the first threshold value Th1 but not smaller than a second threshold value Th2 (for example, Th2=0.6) (this means that it is highly likely that the occupant will perform that setting operation), the control information correcting unit 64 displays the kind of the setting operation on the A/C operation panel 59 or on the display unit of the navigation system 56 or the like to notify the occupant. The control information correcting unit 64 thus queries the occupant whether the setting operation should be executed or not. When the occupant responds by performing an operation for approving the execution of the setting operation (for example, by depressing a designated operation button) through the A/C operation panel 59 or the like, the control information correcting unit 64 executes the setting operation. The control information correcting unit 64 may be configured to notify the occupant of the kind of the setting operation by voice through the A/C operation panel 59 or the navigation system 56. Further, a microphone may be connected to the automotive air conditioner 1, and a voice recognition program may be incorporated in the controller 60 so that the control information correcting unit 64 can determine whether to execute or not to execute the setting operation, by responding to the occupant's voice.

A description will be given below by dealing with an example in which the set temperature $T_{set}$ is lowered by 3° C. Here, the first threshold value Th1 is set to 0.9, and the second threshold value Th2 to 0.6.

Figure 3:
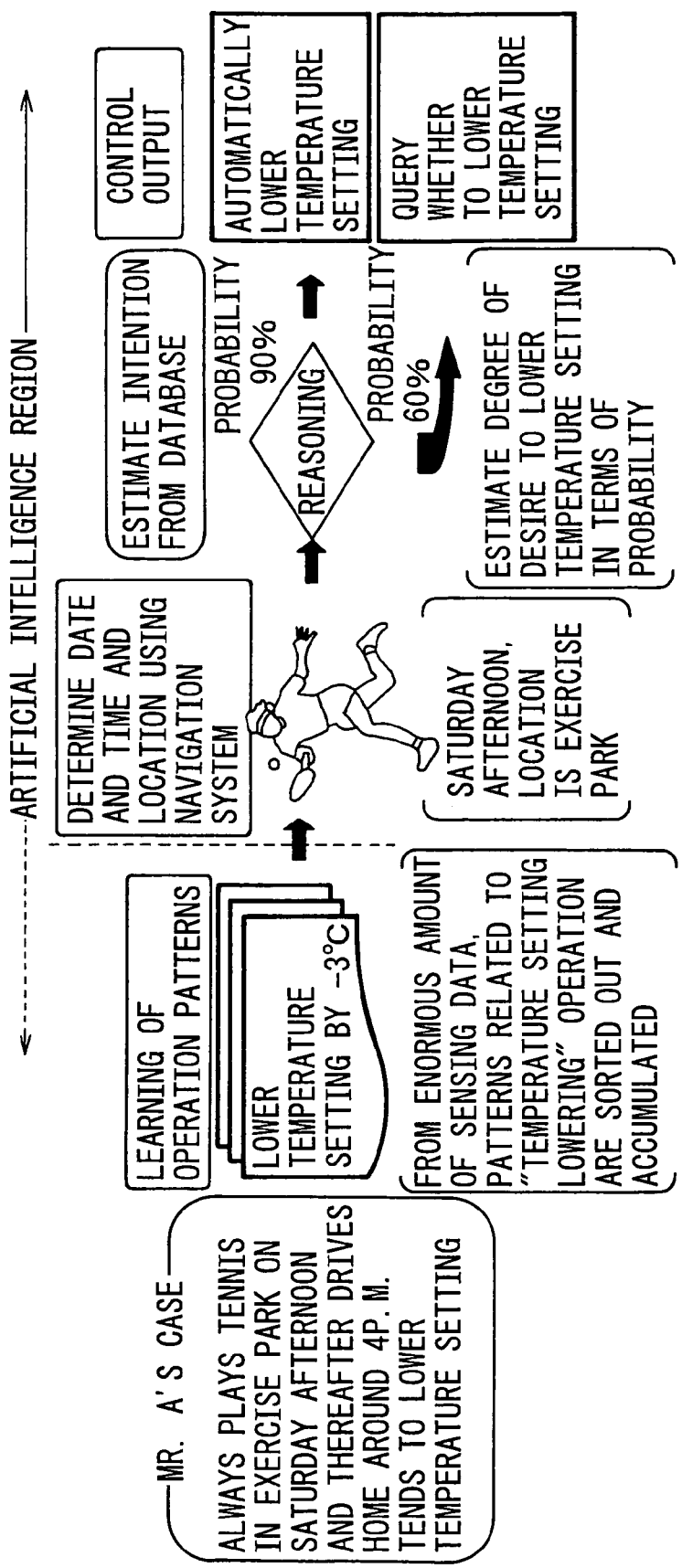
FIG. 3 is a diagram showing one example of a specific situation.

FIG. 3 shows one example of such a specific situation. In the situation shown here, it is assumed that the occupant (Mr. A) always plays tennis in an exercise park on Saturday afternoon and thereafter drives his car home around 4 p.m. It is assumed that, in this situation, Mr. A prefers to set the automotive air conditioner for a lower temperature than usual. In other situations, for example, when driving home after work, he does not perform such a setting operation.

Figure 4:
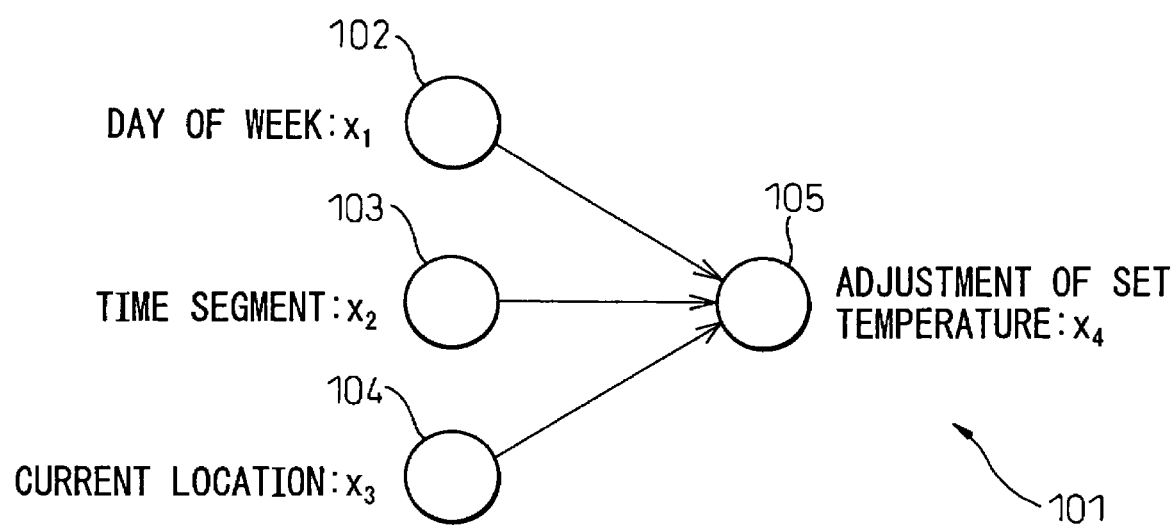
FIG. 4 is a diagram showing a graph structure for one example of a probabilistic model used for automatically adjusting a set value in the automotive air conditioner.
Figure 8A:
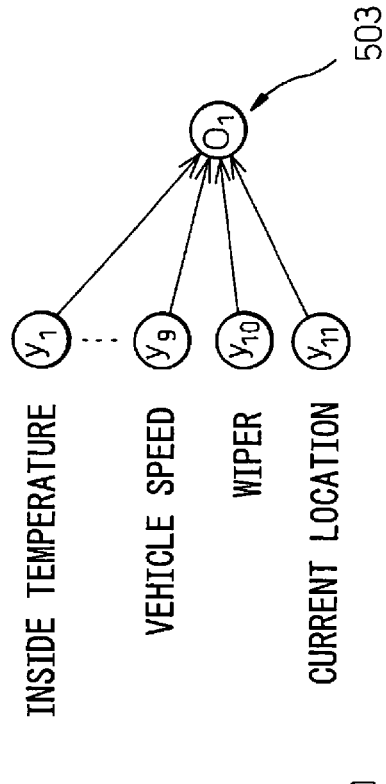
FIGS. 8A to 8D are diagrams showing standard models each having a graph structure that forms the basis of a probabilistic model.
Figure 8C:
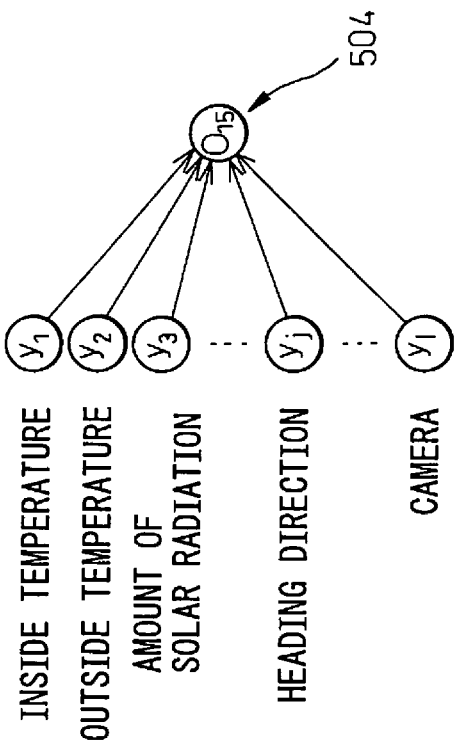
Figure 8B:
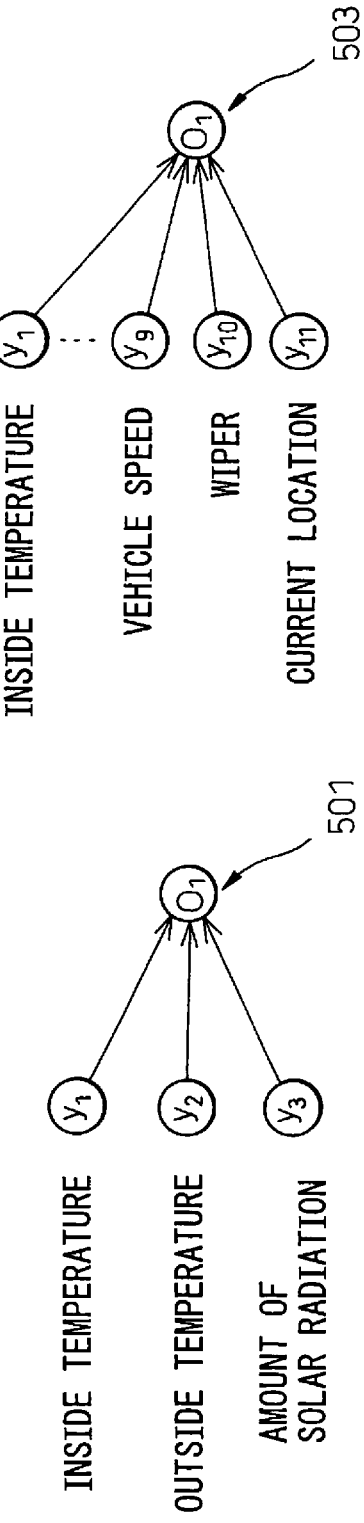
Figure 8D:
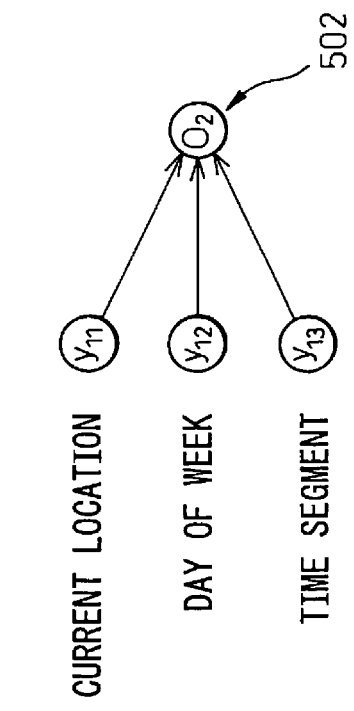

FIG. 4 shows a graph structure for one example of the probabilistic model used for automatically adjusting the setting parameter of the automotive air conditioner 1. In the probabilistic model 101 shown in FIG. 4, three input nodes 102, 103, and 104 are connected to an output node 105. Day of week ($X_1$), time segment ($X_2$), and current location ($X_3$) are given as state information to the respective input nodes 102, 103, and 104. The output node 105 outputs the probability of the set temperature $T_{set}$ being lowered by 3° C.

FIGS. 5A to 5D show CPTs 106 to 109 for the respective nodes in the probabilistic model 101 shown in FIG. 4. The CPTs 106 to 108 correspond to the input nodes 102 to 104, respectively. The CPTs 106 to 108 each provide the prior probability of the input state information. The CPT 109 corresponds to the output node 105, and provides the distribution of the conditional probabilities allocated to the various values of the information given to the respective input nodes.

When all of the information given to the respective input nodes is known, i.e., when the day of week is Saturday ($X_1=1$), the time segment is daytime ($X_2=1$), and the current location is the park ($X_3=1$), for example, it can be seen from FIG. 5D that the probability, $P(X_4=1|X_1=1, X_2=1, X_3=1)$, of the set temperature $T_{set}$ being lowered by 3° C. is 0.95. Since the obtained probability is greater than the first threshold value Th1, the control information correcting unit 64 corrects the setting parameter so as to lower the set temperature $T_{set}$ by 3° C.

On the other hand, when the day of week is Saturday ($X_1=1$) and the time segment is daytime ($X_2=1$), but it is not possible to determine the current location because power is not turned on to the navigation system 56, for example, then $P(X_4=1|X_1=1, X_2=1, X_3)$ is calculated using the prior probability $P(X_3)$ shown in FIG. 5C for the case where the current location is the park. That is $$P(X_4 = 1 | X_1 = 1, X_2 = 1, X_3) =$$
$$P(X_4 = 1 | X_1 = 1, X_2 = 1, X_3 = 1) \cdot P(X_3 = 1) +$$
$$P(X_4 = 1 | X_1 = 1, X_2 = 1, X_3 = 0) \cdot P(X_3 = 0) =$$
$$0.95 \cdot 0.15 + 0.55 \cdot 0.85 = 0.61$$

Since the obtained probability is smaller than the first threshold value Th1 but greater than the second threshold value Th2, the control information correcting unit 64 queries the occupant via the A/C operation panel 59 or the like whether or not the set temperature $T_{set}$ should be lowered by 3° C.

Further, when the day of week is Monday ($X_1=0$), the time segment is nighttime ($X_2=0$), and the current location is the office ($X_3=0$), it can be seen from FIG. 5D that the probability, $P(X_4=1|X_1=0, X_2=0, X_3=0)$, of the set temperature $T_{set}$ being lowered by 3° C. is 0.1. Since the obtained probability is smaller than the first threshold value Th1 and the second threshold value Th2, the control information correcting unit 64 does not change the set temperature $T_{set}$, nor does it query the occupant whether to change the set temperature $T_{set}$.

In the above example, the probabilistic model has been described as having a two-layer network structure for simplicity, but it may be constructed from a network structure with three or more layers including an intermediate layer. Further, the classification of the state information given to the respective input nodes is not limited to the above example. The classification of the state information will be described later in connection with the learning unit 66.

When there is more than one probabilistic model associated with the same operation group (the groups are classified according to the kind of operation, for example, temperature setting correction, airflow level change, inside/outside air selection, airflow ratio setting, etc.), that is, when there is more than one probabilistic model that outputs the probability of correcting a specific setting parameter, the control information correcting unit 64 calculates the probability based on each of such probabilistic models. The specific setting parameters here include those of airflow level setting, inside/outside air selection, and airflow ratio setting. The control information correcting unit 64 performs the above operation by selecting the greatest probability from among the obtained probabilities. For example, consider the case where there are probabilistic models M1 (for setting the airflow level W to maximum) and M2 (for setting the airflow level W to a medium level) associated with the airflow level setting. In this case, the control information correcting unit 64, based on the probabilistic model M1, obtains the probability $PM_1$ of the airflow level W being set to maximum and, based on the probabilistic model M2, calculates the probability $PM_2$ of the airflow level W being set to a medium level. If $PM_1>PM_2$, the control information correcting unit 64 compares $PM_1$ with the threshold values Th1 and Th2 to determine whether to set the airflow level W to maximum. Conversely, if $PM_2>PM_1$, the control information correcting unit 64 compares $PM_2$ with the threshold values Th1 and Th2 to determine whether to set the airflow level W to a medium level.

In the above example, the probabilistic models M1 and M2 have been described as being associated with different setting operations for ease of understanding. However, the probabilistic models M1 and M2 may be associated with the same setting operation (for example, both for setting the airflow level W to maximum). This corresponds, for example, to the case where the occupant may perform the same operation in two or more different situations (for example, one in which the time segment is daytime and the weather is fine, and the other in which the occupant is on the way home from a fitness club). If probabilistic models corresponding to the respective situations are generated, the probabilistic models will be associated with the setting operation belonging to the same operation group.

When the setting parameters such as set temperature $T_{set}$ and airflow level W are corrected to suit specific situations as described above, the control information correcting unit 64 stores the corrected setting parameters in the RAM of the controller 60 so that the parameters can be used by the various units in the controller 60.

The air-conditioning control unit 65 reads from the RAM the value of each setting parameter and the sensing information acquired from each sensor, and controls the air-conditioning unit 10 based on the readout values. For this purpose, the air-conditioning control unit 65 includes a temperature adjusting subunit 651, a compressor control subunit 652, an air outlet control subunit 653, an air inlet control subunit 654, and an airflow level setting subunit 655. When the setting parameter corrected by the control information correcting unit 64 is stored in the RAM, the air-conditioning control unit 65 uses the corrected parameter by retrieving it from the RAM.

The temperature adjusting subunit 651, based on the set temperature $T_{set}$ and the measurement signals from the temperature sensors and the solar sensor 53, determines the outlet temperature of the conditioned air (air conditioning temperature $T_{ao}$) to be discharged from the air outlets. The temperature adjusting subunit 651 determines the opening of the air mix door 28 so that the temperature of the conditioned air will become substantially identical with the air conditioning temperature $T_{ao}$. Then, the temperature adjusting subunit 651 sends a control signal to the temperature control servo motor 31, which then moves the air mix door 28 to the thus determined position. The opening of the air mix door 28 is determined, for example, based on a mathematical relation that takes as an input a value obtained by correcting the difference between the inside temperature $T_r$ and the set temperature $T_{set}$ by the outside temperature $T_{am}$, the amount of solar radiation S, etc., and that yields the opening of the air mix door 28 as an output. The temperature adjusting subunit 651 determines the opening of the air mix door 28 at predetermined intervals of time (for example, every five seconds). The mathematical relationship between the measurement values and the opening of the air mix door 28, for controlling the air mix door 28 in the above manner, is shown below.

$$T_{ao} = k_{set}T_{set} - k_r T_r - k_{am}T_{am} - k_s S + C$$

$$Do = aT_{ao} + b$$

Do indicates the opening of the air mix door 28. Further, the coefficients $k_{set}$, $k_r$, $k_{am}$, $k_s$, C, a, and b are constants, and $T_{set}$, $T_r$, $T_{am}$, and S denote the set temperature, the inside temperature, the outside temperature, and the amount of solar radiation, respectively. When the set temperature $T_{set}$ is corrected by the control information correcting unit 64, the temperature adjusting subunit 651 uses the corrected set temperature $T_{set}$. The opening Do of the air mix door 28 is 0% when the passage 32 passing through the heater core 29 is closed (that is, when providing only cooled air) and 100% when the bypass passage 30 is closed (that is, when providing only heated air). The coefficients $k_{set}$, $k_r$, $k_{am}$, $k_s$, and C in the temperature control equation and the coefficients a and b in the mathematical relationship for finding the opening of the air mix door are set as temperature control parameters for each registered user. These parameters are included in the personal setting information of the registered user.

The temperature adjusting subunit 651 may be configured to determine the air conditioning temperature $T_{ao}$ and the opening of the air mix door 28 by using other known control methods such as a fussy control method or a control method that uses a neural network. The calculated air conditioning temperature $T_{ao}$ is stored in the storage unit 60 so that it can be referred to by other constituent units of the controller 60.

The compressor control subunit 652 controls the ON/OFF operation of the compressor 11 based on the air conditioning temperature (outlet air temperature) $T_{ao}$ obtained by the temperature adjusting subunit 651 as well as on the set temperature $T_{set}$, evaporator outlet temperature, etc. When operating the defroster while cooling the passenger compartment, the compressor control subunit 652 usually puts the refrigeration cycle R in operation by operating the compressor 11. However, when the evaporator outlet temperature drops to a level close to the temperature at which the evaporator 18 frosts, the compressor control subunit 652 turns off the compressor 11 in order to prevent the evaporator 18 from frosting. Then, when the evaporator outlet temperature increases up to a certain level, the compressor control subunit 652 turns on the compressor 11 again. The control of the compressor 11 can be performed using a known method such as a variable capacity control method, and therefore, the details of the control will not be describe herein.

The air outlet control subunit 653 determines the airflow ratio of the conditioned air between the various air outlets, based on the airflow ratio value set by the occupant from the A/C operation panel 59, the air conditioning temperature $T_{ao}$ determined by the temperature adjusting subunit 651, the set temperature $T_{set}$, etc. Then, the air outlet control subunit 653 determines the openings of the foot-level door 37, face-level door 38, and defroster door 39 so as to match the thus determined airflow ratio. The air outlet control subunit 653 determines the openings of the respective doors 37 to 39 in accordance with mathematical relations that defines the relationships between the airflow ratio set value, air conditioning temperature $T_{ao}$, set temperature $T_{set}$, etc. and the openings of the respective doors 37 to 39. Such mathematical relations are predefined and incorporated into a computer program to be executed in the controller 60. Here, the air outlet control subunit 653 may determine the openings of the respective doors 37 to 39 by using other known methods. The air outlet control subunit 653 controls the mode servo motor 40 so that the doors 37 to 39 move to the respectively determined positions. When the airflow ratio set value or the set temperature $T_{set}$ is corrected by the control information correcting unit 64, the air outlet control subunit 653 determines the openings of the respective doors 37 to 39 by using the corrected set value or set temperature $T_{set}$.

The air inlet control subunit 654 determines the ratio between the air that the automotive air conditioner 1 draws in through the inside air inlet 26 and the air that it draws in through the outside air inlet 27, based on the air inlet setting acquired from the A/C control panel 59 and on the set temperature $T_{set}$, the air conditioning temperature $T_{ao}$, the inside temperature $T_r$, etc. The air inlet control subunit 654 determines the opening of the inside/outside air switching door 25 in accordance with a mathematical relation that defines the relationship of the inlet air ratio relative to the outside temperature $T_{am}$, the difference between the inside temperature $T_r$ and the set temperature $T_{set}$, etc. Such a mathematical relation is predefined and incorporated into a computer program to be executed in the controller 60. Here, the air inlet control subunit 654 may determine the opening of the inside/outside air switching door 25 by using other known methods. The air inlet control subunit 654 controls the inside/outside air servo motor 24 and turns the inside/outside air switching door 25 so as to achieve the obtained inlet air ratio. When the inlet set value or the set temperature $T_{set}$ is corrected by the control information correcting unit 64, the air inlet control subunit 654 determines the opening of the inside/outside air switching door 25 by using the corrected inlet set value or set temperature $T_{set}$.

The airflow level setting subunit 655 determines the rotational speed of the blower fan 21 based on the airflow level W acquired from the A/C control panel 59 and on the set temperature $T_{set}$, the air conditioning temperature $T_{ao}$, the inside temperature $T_r$, the outside temperature $T_{am}$, and the amount of solar radiation S. Then, the airflow level setting subunit 655 sends a control signal to the drive motor 22, which then drives the blower fan 21 at the thus determined rotational speed. For example, when the airflow level setting is in the manual setting mode, the airflow level setting subunit 655 determines the rotational speed of the blower fan 21 so that it matches the airflow level W acquired from the A/C control panel 59. On the other hand, when the airflow level setting is in the automatic setting mode, the airflow level setting subunit 655 determines the rotational speed of the blower fan 21 in accordance with an airflow level control equation that defines the relationship of the airflow level W relative to the inside temperature $T_r$, air conditioning temperature $T_{ao}$, etc. Alternatively, the airflow level setting subunit 655 may use an airflow level control equation that directly defines the relationship of the airflow level W relative to the set temperature $T_{set}$ and the air conditioning information (inside temperature $T_r$, outside temperature $T_{am}$, and amount of solar radiation S). In this way, the airflow level setting subunit 655 can use various known airflow level control equations. Such an airflow level control equation is predefined and incorporated into a computer program to be executed in the controller 60. Alternatively, a map defining the relationship between the air conditioning information and the airflow level W may be constructed in advance, and the airflow level setting subunit 655 may determine the rotational speed of the blower fan 21 based on a map control that determines the airflow level W corresponding to the measured air conditioning information by referring to the map. The airflow level setting subunit 655 can also determine the rotational speed of the blower fan 21 by using other known methods. When the airflow level W or the set temperature $T_{set}$ is corrected by the control information correcting unit 64, the airflow level setting subunit 655 determines the rotational speed of the blower fan 21 by using the corrected airflow level W or set temperature $T_{set}$.

When the occupant operates the automotive air conditioner 1, the learning unit 66 determines whether a new probabilistic model is to be generated or an existing probabilistic model is to be updated. When it is determined that a probabilistic model needs to be generated or updated, the learning unit 66 generates or updates the probabilistic model. Further, the learning unit 66 corrects the control equation such as the temperature control equation or the airflow level control equation as needed. For this purpose, the learning unit 66 includes a learned information accumulating subunit 661, a clustering subunit 662, a probabilistic model constructing subunit 663, a probabilistic model evaluating subunit 664, and a control equation correcting subunit 665. The various subunits contained in the learning unit 66 will be described in detail below.

The learned information accumulating subunit 661 associates the acquired state information with the setting operation performed by the occupant, and stores it in the storage unit 61 as the learned information necessary to construct a probabilistic model for estimating the setting operation to be performed by the occupant.

Generally, when the air conditioning state in the passenger compartment is not comfortable for the occupant, the occupant changes the setting of the automotive air conditioner 1. Accordingly, when the occupant frequently changes the setting of the automotive air conditioner 1, it may be necessary to construct a probabilistic model for estimating the setting operation to be performed by the occupant. However, for the construction of an appropriate probabilistic model, it will become necessary to gather a sufficient amount of data in order to make a statistically correct estimation. In view of this, each time the setting of the automotive air conditioner 1 is changed, the learned information accumulating subunit 661 stores the acquired state information (air conditioning information such as outside temperature $T_{am}$, location information such as the current location of the vehicle, vehicle behavior information such as the vehicle speed, physiological information such as the heart rate) as learned information $D_{AK}$ in the storage unit 61. The learned information $D_{AK}$ is stored by being associated with the setting operation number k and the occupant's ID. Alternatively, among the state information gathered at periodic intervals of time irrespectively of the operation for changing the setting of the automotive air conditioner 1, the state information sampled at a time instant nearest to the time of the setting change operation or immediately before or after the time of the setting change operation may be stored as the learned information in the storage unit 61 by associating it with the setting operation number k and the occupant's ID. Further, the learned information accumulating subunit 661 may sample the state information at periodic intervals of time (for example, every five seconds) irrespectively of the operation for changing the setting the automotive air conditioner 1, and may store the state information sampled at each sampling instant in the storage unit 61 by associating it with the setting operation number k and the occupant's ID corresponding to the setting state at that time instant. Alternatively, from the state information being gathered at periodic intervals of time, the learned information accumulating subunit 661 may sample the state information at periodic intervals of time (for example, every one or five minutes) and may store the state information sampled at each sampling instant in the storage unit 61 by associating it with the setting operation number k and the occupant's ID corresponding to the setting state at that time instant. The state information thus gathered at periodic intervals of time may also be used for the construction of the probabilistic model.

Further, the number, $i_{AK}$, of times that a particular occupant (for example, occupant A) has performed the setting operation α corresponding to the setting operation number k (for example, the operation for lowering the set temperature by 3° C. or setting the airflow level W to maximum) is also stored in the storage unit 61. The above learned information $D_{AK}$ is expressed, for example, by the following equation.

$$D_{Ak} = \begin{pmatrix} d_{11k} & d_{12k} & d_{13k} & \cdots & d_{1lk} \\ d_{21k} & d_{22k} & & \cdots & d_{2lk} \\ d_{31k} & & \ddots & & \\ \vdots & & & d_{ijk} & \\ d_{m1k} & & & & d_{mlk} \end{pmatrix}$$

where $d_{ijk}$ represents the value of each piece of state information. Here, i indicates the number, $i_{AK}$, of times that the operation has been performed. On the other hand, j is the state item number assigned to each value of the state information for convenience. In the present embodiment, the inside temperature $T_r$ is assigned for j=1. Similarly, the outside temperature $T_{am}$ is assigned for j=2, and the amount of solar radiation S for j=3. Then, the location information, the vehicle behavior information, the physiological information, etc. are assigned for j=4 and subsequent values of j. Further, k represents the setting operation number.

The learned information $D_{AK}$ and the number, $i_{AK}$, of times that the operation has been performed are stored in the storage unit 61 for each registered user and for each setting operation.

Of the various pieces of state information contained in the learned information $D_{AK}$, the clustering subunit 662 performs clustering on those that cannot be classified in advance into a plurality of classes, and determines the class for the value of such state information in order to construct a CPT for each node of the probabilistic model.

There are cases where information whose possible values cannot be limited to a given pattern or whose value varies continuously, for example, the vehicle's current location information, the temperature information such as the outside temperature and the inside temperature, the time information, etc., is used as the state information to be given to an input node of the probabilistic model. To construct a CPT that takes such information as an input parameter, how the input state information value is to be classified becomes an important issue. For example, consider the case of constructing a probabilistic model corresponding to the setting operation for lowering the set temperature by 3° C. in a specific situation where, after doing physical exercise, the occupant gets into the vehicle parked in the parking lot of the park, as shown in the example of FIG. 3. In this case, to use the vehicle's location information as one of the various pieces of state information to be given to the input nodes of the probabilistic model, it is important to classify the vehicle's location information by at least differentiating the case where the vehicle is located in the parking lot of the park from the case where the vehicle is located in some other place. Similarly, consider the case of constructing a probabilistic model corresponding to the setting operation for setting the air conditioner to the inside air recirculation mode in a specific situation where the vehicle is traveling on a certain national road. In this case, to use the vehicle's location information as one of the various pieces of state information to be given to the input nodes of the probabilistic model, it is important to differentiate the case where the vehicle is traveling on that national road from the case where the vehicle is located in some other place than that national road. As shown in these two examples, the vehicle's location information differs not only in terms of the location but also in terms of the range it covers between the case where the vehicle is located in the parking lot of the park and the case where the vehicle is traveling on the national road. It is therefore clear that the vehicle's location information cannot be classified in advance according to such specific situations.

In view of the above, the clustering subunit 662 performs clustering on state information whose value cannot be classified in advance, such as the vehicle's current location information, the temperature information such as the outside temperature and the inside temperature, the time information, etc. The clustering subunit 662 performs clustering on such state information in two stages, first by classifying the information into narrow-range clusters and then by classifying it into wide-range clusters. By this clustering, the clustering subunit 662 determines the class of each value of the state information so as to be able to address not only the case where the values of the state information corresponding to a specific situation are distributed over a narrow range but also the case where the values are distributed over a wide range. The clustering subunit 662 does not perform clustering on state information of the kind that only takes discrete values with a limited number of classes, such as the wiper, turn signal, or car audio ON/OFF state information.

FIG. 6 is an operation flowchart showing a clustering procedure.

First, from the learned information $D_{AK}$, the clustering subunit 662 extracts the values $(d_{1jk}, d_{2jk}, \ldots, d_{ijk})$ stored for the designated state information as the data on which clustering is to be performed. Then, the clustering subunit 662 calculates the Euclidean distance $UD_{ij}$ between each pair of data (step S201). When the state information is location information, for example, the Euclidean distance $UD_{ij}$ represents the physical distance between the pair of data. On the other hand, when the state information is time information, the Euclidean distance $UD_{ij}$ corresponds to the time difference between the pair of data. Likewise, when the state information is temperature information, the Euclidean distance $UD_{ij}$ corresponds to the temperature difference between the pair of data. Next, the clustering subunit 662 checks whether or not the minimum value $UD_{ijmin}$ of the Euclidean distance is smaller than or equal to a first distance $Td_1$ (step S202). If the minimum value $UD_{ijmin}$ of the Euclidean distance is smaller than or equal to the first distance $Td_1$ in step S202, the clustering subunit 662 places the pair of data that yielded the minimum value into the same cluster (step S203). Here, when the state information is location information, the first distance $Td_1$ can be set, for example, to 300 m. When the state information is time information, the first distance $Td_1$ can be set, for example, to five minutes. After that, control is returned to step S201. The clustering subunit 662 carries out step S201 once again. In this case, the clustering subunit 662 calculates the Euclidean distance between one cluster and another cluster based on a nearest neighbor method. That is, the Euclidean distance $D(C_1, C_2)$ between the two clusters $C_1$ and $C_2$ is expressed by the following equation.

$$D(C_1, C_2) = \min_{x \in C_1, y \in C_2} Ud_{xy}$$

where x and y are data contained in the respective clusters $C_1$ and $C_2$, and $UD_{xy}$ represents the Euclidean distance between x and y. Here, each data itself can be regarded as a cluster the number of data contained in which is 1.

On the other hand, if the minimum value $UD_{ijmin}$ of the Euclidean distance is greater than the first distance $Td_1$ in step S202, the clustering subunit 662 selects the two largest clusters in terms of the number of data contained in the cluster, and labels the selected clusters $C_1$ and $C_2$, respectively (step S204).

Next, for the data not contained in the clusters $C_1$ and $C_2$, the clustering subunit 662 calculates the Euclidean distance $UD_{ij}$ between each pair of data (step S205). Then, the clustering subunit 662 checks whether or not the minimum value $UD_{ijmin}$ of the Euclidean distance is smaller than or equal to a second distance $Td_2$ (step S206). Here, the second distance $Td_2$ is greater than the first distance $Td_1$; for example, when the state information is location information, the second distance $Td_2$ can be set to 3 km. When the state information is time information, the second distance $Td_2$ can be set, for example, to 60 minutes. If the minimum value $UD_{ijmin}$ of the Euclidean distance is smaller than or equal to the second distance $Td_2$ in step S206, the clustering subunit 662 places the pair of data that yielded the minimum value into the same cluster (step S207). After that, control is returned to step S205. The clustering subunit 662 carries out step S205 once again. In this case also, the clustering subunit 662 calculates the Euclidean distance between one cluster and another cluster based on a nearest neighbor method.

On the other hand, if the minimum value $UD_{ijmin}$ of the Euclidean distance is greater than the second distance $Td_2$ in step S206, the clustering subunit 662 selects the two largest clusters in terms of the number of data contained in the cluster, and labels the selected clusters $C_3$ and $C_4$, respectively (step S208).

The clustering subunit 662 calculates the centroids $G_1$ to $G_4$ of the respective clusters $C_1$ to $C_4$. Further, the clustering subunit 662 obtains the distances $r_1$ to $r_4$ to the data located farthest away from the respective centroids $G_1$ to $G_4$ in the respective clusters. Then, the clustering subunit 662 determines the ranges of the state information values corresponding to the respective clusters $C_1$ to $C_4$ as being the areas of radii $r_1$ to $r_4$ centered at the respective centroids $G_1$ to $G_4$ (step S209). The clustering subunit 662 stores the thus obtained centroids $G_1$ to $G_4$ and distances $r_1$ to $r_4$, as well as the number of data contained in the respective clusters, into the storage unit 61 by associating them with the respective clusters $C_1$ to $C_4$.

Finally, the clustering subunit 662 groups the data not contained in any one of the clusters $C_1$ to $C_4$ into one cluster $C_5$ (step S210). Then, the range of the cluster $C_5$ is set as a range not contained in any one of the clusters $C_1$ to $C_4$.

As described above, the clustering subunit 662 performs hierarchical clustering by classifying the data into narrow-range clusters in which the distance between data is relatively small and wide-range clusters in which the distance between data is relatively great. As a result, the clustering subunit 662 can appropriately classify the ranges of the values of the state information to be given to the input node of the probabilistic model. An explanation will be given below by dealing with an example in which the clustering is performed on the vehicle's location information (operation point) contained in the learned information related to the setting operation for setting the automotive air conditioner 1 to the inside air recirculation mode. In this example, the first distance $Th_1$ is set to 300 m, and the second distance $Th_2$ to 3 km. The coordinates of the operation point are acquired from the navigation system, and are expressed as two-dimensional data defined by latitude and longitude.

FIG. 7 shows an example of the distribution of operation points. In the illustrated example, it is assumed that the national road, the company parking lot, the fitness club parking lot, the parking lot of the nearby supermarket, and the home garage are located more than 300 meters apart from each other, and that the size of each parking lot falls within a circle having a diameter of 300 meters. Further, the operation points on the national road are distributed over an area wider than 300 meters (the operation point greatly differs, for example, when setting the mode to inside air recirculation immediately after entering the national road than when setting the mode to inside air recirculation after a few minutes). Accordingly, when the clustering subunit 662 performs the clustering in accordance with the above procedure, first in the narrow-range clustering stage (steps S201 to S204) operation points located in the company parking lot are classified as belonging to the narrow-range cluster $C_1$, and operation points located in the fitness club parking lot are classified as belonging to the narrow-range cluster $C_2$.

Next, in the wide-range clustering stage (steps S205 to S208), of the operation points not classified as $C_1$ or $C_2$, operation points located on the national road (near the company) are classified as belonging to the wide-range cluster $C_3$, and operation points located on the national road (near the home) are classified as belonging to the wide-range cluster $C_4$.

In this way, the clustering subunit 662 can classify the location information so as to match any specific situation, for example, a specific situation where the vehicle is traveling on the national road or a specific situation where the vehicle is located in the company parking lot. As a result, the location information can be used to construct probabilistic models corresponding to the inside air recirculation mode setting operation to match such specific situations.

The clustering subunit 662 may calculate the Euclidean distance $UD_{ij}$ between the clusters by using other hierarchical clustering techniques than the nearest neighbor method, for example, a furthest neighbor method, a group average method, or Ward's method. Further, in step S204 or S208, if there is only one cluster that contains two or more pieces of location information, the clustering subunit 662 may select only the cluster that contains the larger number of pieces of location information. In like manner, when there is no cluster that contains two or more pieces of location information, the clustering subunit 662 need not select any clusters.

Further, in step S205 and subsequent steps, the clustering subunit 662 may perform clustering on all the data over again. In this case, if any area contained in the narrow-range cluster $C_1$ or $C_2$ partially or completely overlaps an area contained in the wide-range cluster $C_3$ or $C_4$, preference is given to either one of the clusters and the overlapping area is eliminated from the other cluster.

In the above embodiment, clustering has been performed in two stages, the narrow-range clustering stage and the wide-range clustering stage, but the clustering subunit 662 may perform the clustering in three or more stages, and may select in each stage one or two clusters that contain the larger number of data. Alternatively, the number of stages may not be determined in advance, or the number of clusters to be formed in each stage may not be determined in advance, and when a prescribed number of data (for example, more than one half of the total) have been contained in a prescribed number (for example, five) of clusters, the clustering subunit 662 may terminate the clustering and may group the remaining data into one cluster.

Further, the clustering subunit 662 may determine the range of the value of the state information corresponding to each cluster by a method other than the method used in step S209. For example, when the data to be clustered is the vehicle's location information, the clustering subunit 662 may determine the range of the vehicle's location corresponding to each cluster by obtaining endpoints in the north, east, west, and south directions from the location information contained in that cluster and by defining a rectangular region with these endpoints forming the boundaries. Further, the clustering subunit 662 may determine the range of the value of the state information so that, of the learned data contained in each cluster, the learned data located farthest apart from each other define the limits of the range. Alternatively, the clustering subunit 662 may obtain the midpoint between the data located closest to each other among the learned data contained in adjacent clusters and may determine the midpoint as the boundary between the ranges of the values of the state information corresponding to the respective clusters. As an example, consider the case where, when clustering is done on the time information, the learned data contained in the first cluster are distributed between 08:25 a.m. and 10:15 a.m. while the learned data contained in the second cluster are distributed between 00:15 p.m. and 02:30 p.m. Here, of the learned data contained in each cluster, the clustering subunit 662 takes the data representing the earliest time and the data representing the latest time as the data defining the limits of the range of the value of the state information corresponding to that cluster. Accordingly, the range of the time information corresponding to the first cluster is from 08:25 a.m. to 10:15 a.m., and the range of the time information corresponding to the second cluster is from 00:15 p.m. to 02:30 p.m. Alternatively, the clustering subunit 662 may determine the boundary between the range of the time information corresponding to the first cluster and the range of the time information corresponding to the second cluster by taking the midpoint between the learned data closest to each other in time among the learned data contained in the first and second clusters. In this case, the range of the value of the time information corresponding to the first cluster is from 08:25 a.m. to 11:15 a.m., and the range of the value of the time information corresponding to the second cluster is from 11:15 a.m. to 02:30 p.m.

When the state information to be clustered is given in the form of two or more dimensional information, the clustering subunit 662 may calculate the Euclidean distance by using all of the dimensional information or some of the dimensional information. For example, when the data to be clustered is location information, and the location information is given in the form of three-dimensional information indicating the latitude, the longitude, and the heading direction of the vehicle, the clustering subunit 662 may calculate the Euclidean distance between each pair of data by using all of the latitude, the longitude, and the heading direction, rather than using only the latitude and longitude as earlier described. Or, in the case of a narrow-range cluster, the clustering subunit 662 may perform clustering so that only the data sampled just before the ignition key is turned off is included in the cluster, because the situation where the vehicle is parked can be distinguished from other situations by referring to the ignition key ON/OFF information. Similarly, when performing clustering on time information, the clustering subunit 662 may calculate the Euclidean distance between each pair of data by using only hour/minute or by using the day of week, date, month, season, etc. in addition to hour/minute.

Further, when other information related to the state information to be clustered can be used, the clustering subunit 662 may define the range of the cluster by using the related information. For example, when neighborhood area information or Gbook information showing the facilities (for example, convenience stores, restaurants, etc. on a national road or an expressway or in a tunnel) associated with the location information can be acquired from the navigation system in relation to the location information, the clustering subunit 662 can define the range of the cluster by using such related information. More specifically, when all the data contained in the cluster represent the same facility (for example, in the company parking lot or on a certain national road), the clustering subunit 662 can define the range of the cluster by using the information indicating the range contained in that facility rather than using the centroid and radius as earlier described or in addition to the centroid and radius. By adding the neighborhood area information or Gbook information to the earlier obtained cluster range, the clustering subunit 662 can classify the state information more accurately. Furthermore, the clustering subunit 662 may perform clustering by using a plurality of kinds of state information as one set of learned data. For example, the clustering may be performed by using the vehicle's current location and the time information indicating the current time as one set of learned data. In this case, each data contains such elements as latitude, longitude, and time.

In relation to a plurality of standard models having predetermined graph structures, the probabilistic model constructing subunit 663 constructs tentative probabilistic models by generating CPTs for the nodes contained in the respective standard models based on the learned information and on the classes of the state information determined by the clustering subunit 662.

To construct a versatile probabilistic model that can address various situations, a very large probabilistic model containing a large number of nodes would have to be constructed. However, the learning of such a large probabilistic model would require a very long computation time. It would also require enormous hardware resources. In view of this, the present embodiment constructs probabilistic models for calculating the recommended probability of one setting operation for one specific situation, and 15 kinds of standard models are generated in advance to form the basis of such probabilistic models. Each standard model has a two-layer graph structure in which data that are likely to have a particularly close relationship to the setting operation are selected from among the state information as input parameters, and the probability of the setting operation being performed is obtained based on the conditional probabilities for the combination of the input parameters. Here, the number of standard models is not limited to 15. The number of standard models can be optimized appropriately according to the number of pieces of state information obtained or to the kind of the setting operation to be learned. Each standard model may be constructed to take only one input parameter or to take all obtainable state information as input parameters. Further, the standard model is not limited to the two-layer graph structure, but may be constructed to have a graph structure of three or more layers, depending on the capability of the CPU constituting the controller 60.

The standard models thus generated are stored in the storage unit 61. Then, for each standard model, the probabilistic model constructing subunit 663 constructs a tentative probabilistic model by determining the conditional probability table (CPT) for each node contained in the standard model. That is, with the tentative probabilistic model, the probability of performing the setting operation associated with the tentative probabilistic model is determined based on the class of the value of the state information used as the input parameter.

A detailed description will be given below with reference to the drawings.

FIGS. 8A to 8D show four of the 15 standard models by way of example. The standard models 501 to 504 shown in FIGS. 8A to 8D are each a Bayesian network of two-layer structure comprising input nodes and an input node. The parameters given to the input nodes are different between the respective standard models 501 to 504.

From the learned information $D_{AK}$ retrieved from the storage unit 61, the probabilistic model constructing subunit 663 counts a number n for each class of the value of the state information for each node. Then, the probabilistic model constructing subunit 663 divides that number n by the total number of events, N, to determine the value of the prior probability as well as the conditional probability. If the class of the value of the state information used as the input parameter is already obtained by the clustering subunit 662, the probabilistic model constructing subunit 663 retrieves that class, i.e., the centroid and radius of each cluster, from the storage unit 61, and classifies the state information according to that class. On the other hand, in the case of the state information not yet clustered, the probabilistic model constructing subunit 663 classifies the state information according to a predetermined class. A description will be given by taking the standard model 502 of FIG. 8B as an example. It is assumed here that the learned information $D_{AK}$ contains 30 data sets. From the vehicle's current location information contained in the learned information $D_{AK}$ and allocated to one of the input nodes, the CPT for the current location information is generated. Here, it is assumed that the current location information has been clustered by the clustering subunit 662 into five classes, i.e., the national road (near the company), the national road (near the home), the company parking lot, the fitness club parking lot, and others. If the number of times that the current location is the national road (near the company) ($y_{11}=0$) is 8, the number of times that the current location is the national road (near the home) ($y_{11}=1$) is 6, the number of times that the current location is the company parking lot ($y_{11}=2$) is 6, the number of times that the current location is the fitness club parking lot ($y_{11}=3$) is 5, and the number of times that the current location is some other place ($y_{11}=4$) is 5, then the prior probability $P(y_{11})$ for the current location information is given as $P(y_{11}=0)=0.27$, $P(y_{11}=1)=0.2$, $P(y_{11}=2)=0.2$, $P(y_{11}=3)=0.17$, and $P(y_{11}=4)=0.17$, respectively. Similarly, for the output node, the number of occurrences in the learned information $D_{AK}$ is counted for each combination of the values that the state information given to the respective input nodes or parent nodes, i.e., the current position ($y_{11}$), day of week ($y_{12}$), and time segment ($y_{13}$), can take, and the conditional probability is obtained by dividing that number by the total number of data, i.e., by 30. In this way, by obtaining the prior probability and the conditional probability, the probabilistic model constructing subunit 663 determines the CPT for each node.

If it is considered that the number of data used for learning is not sufficient, the probabilistic model constructing subunit 663 may estimate the probability distribution using a beta distribution and use it to construct the CPT. If some of the input information values do no exist in the learned information $D_{AK}$, that is, if there is unobserved data, the probabilistic model constructing subunit 663 estimates the probability distribution of the unobserved data. Then, the probabilistic model constructing subunit 663 calculates the corresponding conditional probability by calculating the expected value based on the estimated distribution. For the learning of such conditional probabilities, use can be made, for example, of the method described in "Introduction to Bayesian Networks" by Kazuo Shigemasu et al., 1st Edition, Baifukan, July 2006, pp. 35-38, 85-87.

In a similar manner, the probabilistic model constructing subunit 663 generates for the output node a CPT that shows the distribution of the conditional probabilities based on the information given to the respective input nodes. In the initial state, the CPT is set so that the values are equal for all the states.

The probabilistic model evaluating subunit 664 selects the tentative probabilistic model having the most appropriate graph structure by applying an information criterion to all the tentative probabilistic models constructed by the probabilistic model constructing subunit 663.

In the present embodiment, AIC (Akaike's Information Criterion) is used as the information criterion. AIC can be obtained using the following equation that takes as inputs the maximum logarithmic likelihood of the probabilistic model and the number of parameters.

$$AIC_m = -2l_m(\theta_m|X) + 2k_m$$

Here, $AIC_m$ is the ACI for the probabilistic model M. Further, $\theta_m$ represents a set of parameters of the probabilistic model M, $l_m(\theta_m|X)$ the value of the maximum logarithmic likelihood of given data X in the probabilistic model M, and $k_m$ the number of parameters of the probabilistic model M. Here, $l_m(\theta_O|X)$ can be calculated by the following procedure. First, the learning unit 66 obtains the frequency of occurrence from the learned information $D_{AK}$ for each combination of parent node variables at each node. Then, the learning unit 66 multiplies the frequency of occurrence by the logarithmic value of the conditional probability. Finally, the learning unit 66 sums the resulting values to calculate $l_m(\theta_m|X)$. On the other hand, $k_m$ is obtained by adding together the number of combinations of the parent node variables at each node.

When AIC is obtained for all the probabilistic models, the probabilistic model evaluating subunit 664 selects the tentative probabilistic model that yielded the smallest AIC value.

For the selection of the probabilistic model (in other words, the learning of the graph structure), use may be made of other information criteria such as Bayes's Information Criterion (BIC), Takeuchi's Information Criterion (TIC), or Minimum Description Length (MDL). Further, any of these information criteria may be used by inverting the sign of the information criterion calculation equation. In that case, the probabilistic model evaluating subunit 664 selects the tentative probabilistic model that yielded the largest AIC value.

The probabilistic model evaluating subunit 664 determines whether the state information given to the input nodes of the selected tentative probabilistic model contains only the input parameters to the control equation such as the temperature control equation, i.e., the air conditioning information (inside temperature $T_r$, outside temperature $T_{am}$, and amount of solar radiation S). If the state information given to the input nodes contains only the air conditioning information, the probabilistic model evaluating subunit 664 does not add the probabilistic model as it is suspected that the temperature control is not optimized for the occupant's sensitivity to temperature. The control equation correcting subunit 665 then corrects the temperature control equation or the air conditioning control equation, as will be described later.

On the other hand, if the state information given to the input nodes of the selected tentative probabilistic model contains information other than the air conditioning information, it can be considered that the probabilistic model for making the air conditioner setting that matches the specific situation has been constructed. Therefore, the probabilistic model evaluating subunit 664 stores the selected tentative probabilistic model in the storage unit 61, and adds the model as the probabilistic model to be used by the control information correcting unit 64. In this case, neither the temperature control equation nor the air conditioning control equation is corrected. Then, the probabilistic model evaluating subunit 664 acquires the ID of the occupant and the setting operation number k associated with the learned information $D_{AK}$, and stores them in the storage unit 61 by associating them with the added probabilistic model. Further, the probabilistic model evaluating subunit 664 identifies, based on the setting operation number k, the control parameter to be corrected based on the probabilistic model and the correction value to be used, and stores them in the storage unit 61 by associating them with the probabilistic model. The correspondence between the setting operation number k, the control parameter to be corrected, and the correction value to be used is predefined in the form of a lookup table and held in the storage unit 61.

The control equation correcting subunit 665 corrects the temperature control equation or the airflow level control equation.

As an example, when correcting the temperature control equation, the control equation correcting subunit 665 constructs simultaneous equations with temperature control parameters $k_{set}$, $k_r$, $k_{am}$, $k_s$, and C as variables, based on the air conditioning information contained in the learned information $D_{AK}$ and on the set temperature $T_{set}$ and air conditioning temperature $T_{ao}$ obtained after the setting operation. Then, the control equation correcting subunit 665 determines the corrected temperature control parameters by solving the simultaneous equations. Alternatively, based on the amount $\Delta T_{set}$ by which the set temperature $T_{set}$ has been changed by the occupant and the distribution of the solar radiation S at the time of the setting operation, the control equation correcting subunit 665 may approximate the amount of change of the set temperature, $\Delta T_{set}$, by a linear equation of the solar radiation S, as described in Japanese Unexamined Patent Publication No. H05-147421. Then, the control equation correcting subunit 665 may correct the temperature control parameters $K_s$ based on the result of the approximation. Further, the control equation correcting subunit 665 may correct the temperature control equation or the airflow level control equation by using various other known methods such as described in Japanese Unexamined Patent Publication Nos. 2000-293204, 2000-071060, H05-208610, and H05-169963. When a map control is used to control the airflow level, etc., the control equation correcting subunit 665 can correct the map based on a known method by using the learned information $D_{AK}$.

Which control equation is to be corrected is determined in relation to the setting operation α. When the setting operation α is one that concerns the air conditioning temperature setting, the control equation correcting subunit 665 corrects the temperature control equation, and when the setting operation α is one that concerns the airflow level setting, the control equation correcting subunit 665 corrects the airflow level control equation.

The air conditioning operation of the automotive air conditioner 1 according to the embodiment of the present invention will be described below with reference to the flowcharts shown in FIGS. 9A, 9B, and 10. The air conditioning operation is performed by the controller 60 in accordance with a computer program incorporated in the controller 60.

Figure 9A:
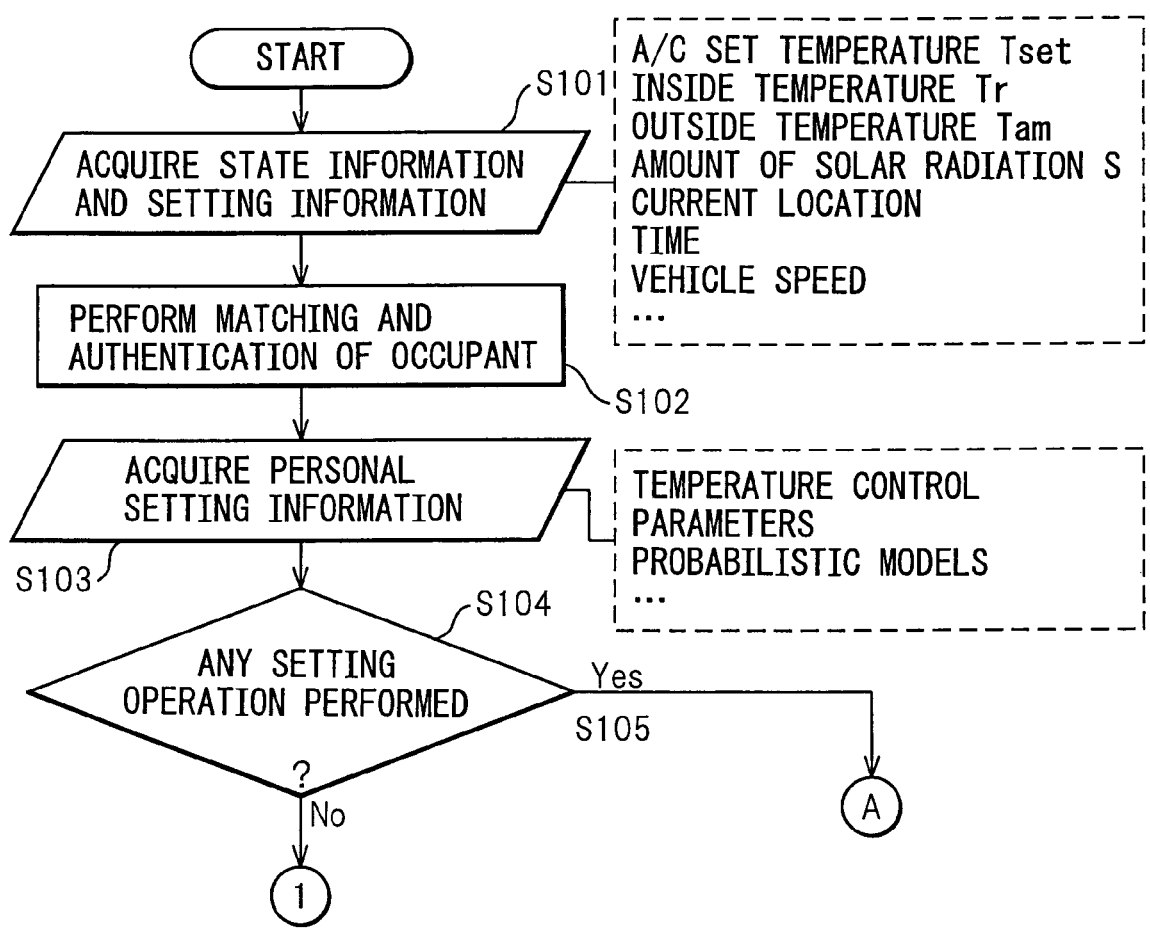

First, as shown in FIG. 9A, when the engine switch is turned on, the controller 60 starts the automotive air conditioner 1. Then, the controller 60 acquires the state information from the various sensors, the navigation system 56, the vehicle operation apparatus 57, etc. via the communication unit 62 (step S101). In like manner, the controller 60 acquires the setting information from the storage unit 61. Next, the matching unit 63 in the controller 60 performs the matching and authentication of the occupant (step S102). Then, the controller 60 retrieves from the storage unit 61 the personal setting information of the registered user identified as matching the occupant (step S103).

Next, the controller 60 determines whether or not the occupant has performed any setting operation on the automotive air conditioner 1, that is, whether any setting has been changed or not (step S104). When an operation signal is received from the A/C operation panel 59, the controller 60 determines that the setting operation has been performed.

As shown in FIG. 9B, if the occupant has not performed any setting operation, the control information correcting unit 64 in the controller 60 selects a probabilistic model whose current setting is to be changed, from among the probabilistic models $M_{Aqk}$ associated with that occupant and with the correction of the control parameter (for example, the set temperature $T_{set}$) related to any one of the operation groups (step S105). The probabilistic model $M_{Aqk}$ represents the q-th probabilistic model constructed for the setting operation identified by the setting operation number k and performed by the occupant A. Next, the control information correcting unit 64 enters the observed state information into the selected probabilistic model. The control information correcting unit 64 then calculates the probability that the setting operation associated with the probabilistic model is performed (step S106). Then, of the probabilities calculated for the setting operation in the same operation group associated with the control parameter, the highest probability is obtained as the recommended probability P.

Next, the control information correcting unit 64 compares the recommended probability P with a first predetermined value Th1 (step S107). If the recommended probability P is greater than or equal to the first predetermined value Th1 (for example, 0.9), the control information correcting unit 64 corrects the corresponding setting parameter of the automotive air conditioner 1 based on the correction information associated with the probabilistic model that yielded the recommended probability P (hereinafter called the selected probabilistic model) (step S108). On the other hand, if the recommended probability P is smaller than the first predetermined value Th1, the control information correcting unit 64 compares the recommended probability P with a second predetermined value Th2 (for example, 0.6) (step S109). If the recommended probability P is greater than or equal to the second predetermined value Th2, the control information correcting unit 64 displays on the display section of the A/C operation panel 59 or the like the setting operation corresponding to the setting operation number k associated with the selected probabilistic model, and thus queries the occupant whether the setting operation should be executed or not (step S110). When the occupant approves the execution of the setting operation, the control information correcting unit 64 corrects the setting parameter based on the correction information associated with the selected probabilistic model (step S108). On the other hand, when the occupant does not approve, the control information correcting unit 64 does not correct the setting parameter. In other words, the control information correcting unit 64 does not execute the setting operation related to the setting parameter associated with the selected probabilistic model. Likewise, if the recommended probability P is smaller than the second predetermined value Th2 in step S109, the control information correcting unit 64 does not correct the setting parameter.

After that, the control information correcting unit 64 determines whether all the setting parameters have been adjusted or not, by checking whether the probability has been calculated for all the probabilistic models (step S111). If there is any probabilistic model for which the probability is not calculated yet, i.e., if there is any operation group that is not yet checked as to whether the setting information is to be corrected or not, the controller 60 returns control to step S105. On the other hand, if the probability has been calculated for all the probabilistic models, then the air-conditioning control unit 65, based on the setting parameters corrected as needed, adjusts the opening of the air mix door, the number of revolutions of the blower fan, and the opening of each air outlet door so as to achieve the desired air conditioning temperature, airflow level, etc. (step S112).

Figure 10:
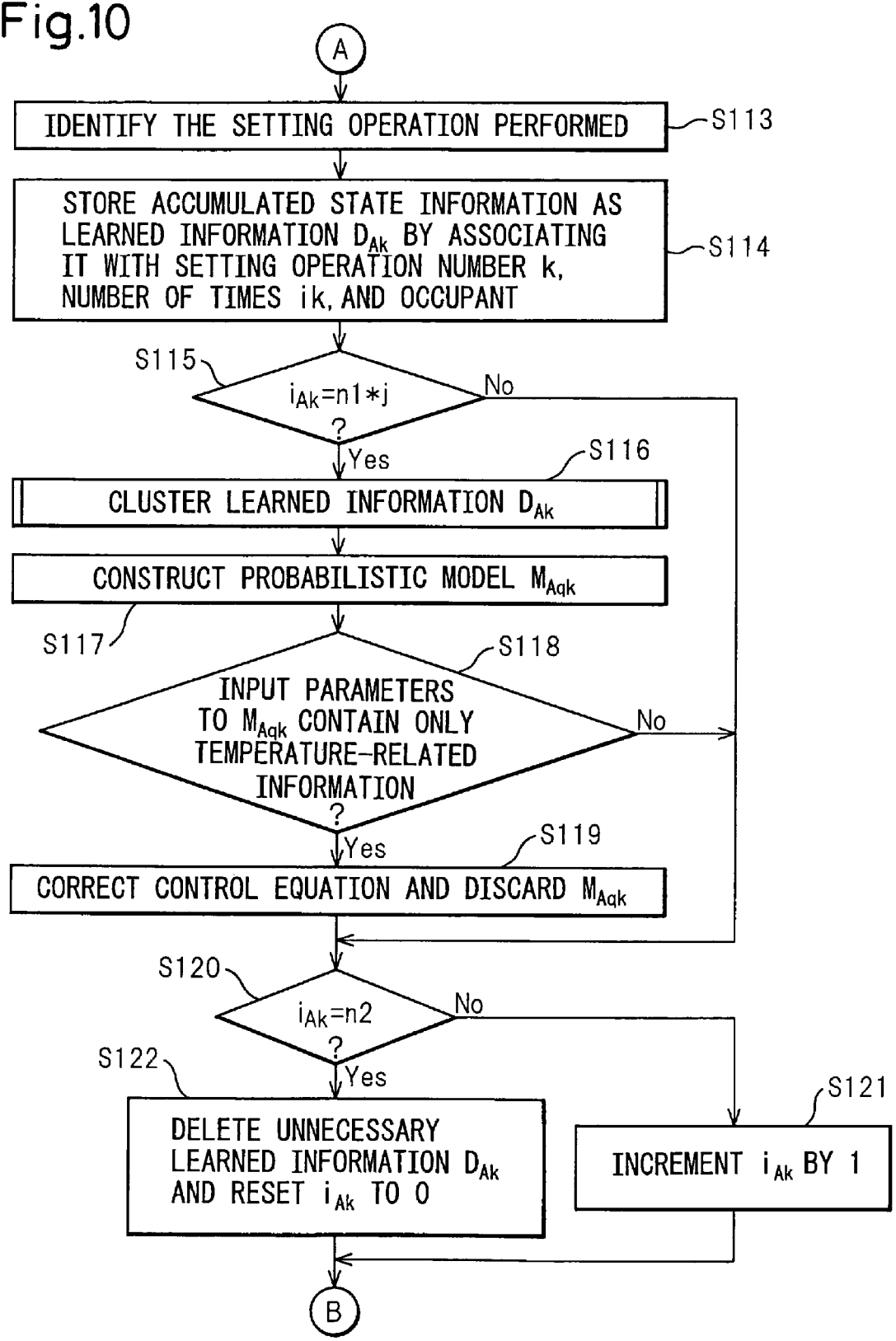
FIG. 10 is a flowchart showing the control operation of the automotive air conditioner according to the embodiment of the present invention.

As shown in FIG. 10, when it is determined in step S104 in FIG. 9A that the occupant has performed a setting operation on the automotive air conditioner 1, the controller 60 identifies which setting operation has been performed by referring to the setting signal (step S113). Then, the controller 60 stores the state information acquired during a predetermined period of time before and after the setting operation (for example, for 10 seconds before and after the setting operation) into the storage unit 61 as an element of the learned information $D_{AK}$ by associating it with the setting operation number k corresponding to that setting operation and the number of times, $i_{AK}$, that the setting operation has been performed (step S114).

Subsequently, the learning unit 66 in the controller 60 determines whether the number of times of the operation, $i_{AK}$, is equal to a predetermined number of times nl*j (j=1, 2, 3) (step S115). The predetermined number of times is, for example, 10. If it is determined that $i_{AK}$=nl*j, the clustering subunit 662 in the learning unit 66 performs clustering on the state information, etc. that takes consecutive values in the learned information $D_{AK}$ stored in the storage unit 61 by being associated with the occupant and the setting operation number k (step S116). Here, the clustering of the learned information is performed in accordance with the procedure shown in the flowchart of FIG. 6.

After that, the learning unit 66 constructs the probabilistic model $M_{Aqk}$ by using the learned information $D_{AK}$ stored in the storage unit 61 by being associated with the occupant and the setting operation number k and also using the class of the state information value range determined by the clustering subunit 662 (step S117). More specifically, the probabilistic model constructing subunit 663 in the learning unit 66 constructs a tentative probabilistic model by generating CPTs for each standard model, as earlier described. Then, the probabilistic model evaluating subunit 664 in the learning unit 66 calculates the information criterion for each tentative probabilistic model, and the tentative probabilistic model that yielded the smallest information criterion value is selected as the probabilistic model $M_{Aqk}$ to be used. The probabilistic model evaluating subunit 664 then stores the probabilistic model $M_{Aqk}$ in the storage unit 61 by associating it with the occupant's ID, etc. On the other hand, if $i_{AK}$ is not equal to nl*j in step S115, the controller 60 transfers control to step S120.

Next, the probabilistic model evaluating subunit 664 determines whether the input parameters to the probabilistic model $M_{Aqk}$ consist only of the air conditioning information (inside temperature $T_r$, outside temperature $T_{am}$, and amount of solar radiation S) (step S118). If the input parameters consist only of the air conditioning information, the probabilistic model evaluating subunit 664 determines that the temperature control is not optimized for the occupant's sensitivity to temperature. Then, the control equation correcting subunit 665 in the learning unit 66 corrects the control equation relating to the setting operation α (for example, when the setting operation α is for changing the temperature setting, the constants $k_{set}$, $k_r$, $k_{am}$, $k_s$, and C in the temperature control equation are adjusted) (step S119). The probabilistic model evaluating subunit 664 then discards the probabilistic model $M_{Aqk}$. On the other hand, if the input parameters to the probabilistic model $M_{Aqk}$ contain information other than the air conditioning information, the probabilistic model evaluating subunit 664 determines that the probabilistic model that matches the specific situation has been constructed. In this case, the probabilistic model evaluating subunit 664 does not correct the control equation relating to the setting operation α, and transfers control to step S120.

Next, the learning unit 66 determines whether the number of times of the operation, $i_{AK}$, is equal to a predetermined number of times n2 (for example, n2=30) (step 120). If $i_{AK}$ is not equal to n2, the learning unit 66 increments $i_{AK}$ by 1 (step S121), and transfers control to step S112 shown in FIG. 9B. On the other hand, if $i_{AK}$=n2 in step S120, the learning unit 66 deletes the learned information $D_{AK}$ stored in the storage unit 61 by being associated with the occupant and the setting operation number k (step S122).

Further, it is determined that the probabilistic model $M_{Aqk}$ currently stored in the storage unit 61 is an established one, and thereafter, no updating is performed on the probabilistic model $M_{Aqk}$. The learning unit 66 appends flag information to the established probabilistic model $M_{Aqk}$ to indicate that the probabilistic model is not to be updated. For example, the learning unit 66 stores an update flag f in the storage unit 61 by associating it with the probabilistic model. The learning unit 66 can determine whether updating is allowed or not by checking the state of the flag; that is, if it is set to 1, updating (rewriting) is prohibited, and if it is set to 0, updating is allowed. The learning unit 66 initializes $i_{AK}$ to 0. After that, the learning unit 66 transfers control to step S112.

The predetermined number of times n2 is larger than n1, and corresponds to the number of data considered sufficient to construct a statistically accurate probabilistic model. The predetermined numbers n1 and n2 can be optimized experimentally and empirically.

In step S115 in the above flowchart, the learning unit 66 may determine whether to construct or not to construct the probabilistic model by checking whether a first predetermined time (for example, one week or one month) has elapsed since the last time the probabilistic model associated with the same setting operation was constructed, rather than by comparing the number of times of the operation, $i_{AK}$, with the prescribed number of times nl*j (j=1, 2, 3). In this case, the learning unit 66 constructs the probabilistic model only when the predetermine time has elapsed. In other words, the learning unit 66 proceeds to carry out the process from step S116 to S122. To determine whether to construct or not to construct the probabilistic model based on the elapsed time, the controller 60 stores the time and date of construction of the probabilistic model in the storage unit 61 by associating it with the probabilistic model. When calculating the elapsed time, the learning unit 66 acquires from the storage unit 61 the time and date of construction associated with the most recent probabilistic model among the probabilistic models related to the setting operation α, and calculates the elapsed time by obtaining the difference between the acquired time and the current time.

Further, when the learning unit 66 determines whether to construct or not to construct the probabilistic model based on the elapsed time, in step S120 the learning unit 66 may compare the elapsed time with a second predetermined time (for example, four weeks or six months) longer than the first predetermined time. Then, when the elapsed time is longer than the second predetermined time, the learning unit 66 deletes the learned information $D_{AK}$ and updates the value of the update flag f.

After that, the automotive air conditioner 1 repeats the control process from steps S101 to S122 until its operation is stopped.

As described above, in generating the probabilistic model, the automotive air conditioner according to the embodiment of the present invention optimally determines the range of the state information value representing the vehicle state, air conditioning state, etc. corresponding to the specific situation and, based on the result, constructs the probabilistic model for calculating the probability; accordingly, the optimum air conditioner setting that accurately matches the specific situation can be automatically accomplished.

The present invention is not limited to the above specific embodiment. For example, the vehicle occupant is not limited to the vehicle driver. If provisions are made to identify who has performed the setting operation on the automotive air conditioner, the present invention can be advantageously applied to the case where any occupant other than the driver operates the air conditioner. For example, when the automotive air conditioner has two A/C operation panels 59 one for the driver and the other for the passenger, the controller 60 may determine which occupant, the driver or the passenger, has operated the air conditioner, by checking which A/C operation panel 59 has been operated. Alternatively, as described in Japanese Unexamined Patent Publication No. 2002-29239, an operating occupant detection sensor such as an infrared temperature sensor may be provided on the A/C operation panel 59 so that the controller 60 can determine which occupant, the driver or the passenger, has operated the air conditioner.

When the passenger has operated the air conditioner, the controller 60 performs the matching and authentication of the passenger based on the image data captured by the in-car camera 54, in the same manner as when performing the matching and authentication of the driver. Then, the controller 60 stores the state information such as various sensor values at the time of the operation as the learned information by associating it with the passenger, not with the driver.

Further, when the occupant is limited to a specific person, or when constructing a probabilistic model only for the kind of setting operation that is expected to be performed by anyone who drives the vehicle, the matching unit 63 may be omitted. In this case, the same probabilistic model and the same learned information for the learning of the probabilistic model are used regardless of who the operating occupant is.

Further, the state information to be used for the construction of the probabilistic model and for the setting operation using the probabilistic model may include information concerning the setting of the automotive air conditioner (such as the set temperature, airflow level, etc.) when the state information was acquired.

In the above embodiment, the parameters to be corrected by the control information correcting unit 64 have been described as being the parameters relating to the setting information such as the temperature setting, airflow level setting, etc. that the occupant can directly set from the A/C operation panel 59. However, the control information correcting unit 64 may be configured to correct, using the probabilistic model, the parameters relating to the control information used to control the various parts of the air-conditioning unit 10, such as the air conditioning temperature $T_{ao}$ calculated using the temperature control equation, the number of revolutions of the blower fan 21 calculated using the airflow level control equation, the opening of the air mix door 28, etc.

The present invention can also be applied extensively to applications where the air conditioner is automatically controlled based on state information that is not directly related to the air conditioning operation. For example, control may be performed automatically to turn on the defroster when the controller 60 receives a signal to operate the wipers, to set the air conditioner to the outside air inlet mode when the cigar lighter is used, or to lower the airflow level when the car audio switch is turned on. Further, the parameters to be automatically corrected may not be directly related to the control of the automotive air conditioner. For example, control may be performed to automatically open the power windows when the airflow level is set to 0. In such cases, the controller 60 sends a corresponding control signal to the vehicle operating apparatus.

In the above embodiment, standard models having predetermined graph structures have been generated in advance for the construction of probabilistic models. However, instead of generating such standard models, the learning unit 66 may search a graph structure by using a K2 algorithm or a genetic algorithm. For example, when using a genetic algorithm, a plurality of "genes" are generated each serving as an element indicating the presence or absence of a connection between nodes. Then, the learning unit 66 calculates the fitness of each gene by using the previously described information criterion. After that, the learning unit 66 selects genes having fitness values greater than a predetermined value, and performs such manipulations as crossover and mutation to produce the next generation of genes. The learning unit 66 repeats such manipulations a plurality of times and selects genes having the best fitness. The learning unit 66 uses the graph structure described by the selected genes to construct the probabilistic model. The learning unit 66 may combine any of these algorithms with the method of constructing the probabilistic model from a standard model.

In the above embodiment, a Bayesian network has been used as the probabilistic model, but other probabilistic models such as a hidden Markov model may be used instead.

The present invention can be applied to an air conditioner of any type, whether it be a front single type, a left/right independent type, a rear independent type, a four-seat independent type, or an upper/lower independent type. When applying the present invention to an air conditioner of an independent type, a plurality of inside temperature sensors and solar sensors may be mounted.

Furthermore, the present invention can be applied to other apparatus than air conditioning apparatus. For example, the present invention can be applied to a control apparatus that acquires a plurality of kinds of state information, enters the state information into a probabilistic model associated with a prescribed control operation, obtains the probability of the prescribed control operation being performed, and performs the prescribed control operation when the probability is greater than a predetermined value.

As described above, various modifications can be made within the scope of the present invention.

What is claimed is:

1. An automotive air conditioner comprising:
   an air-conditioning unit for supplying conditioned air into a vehicle;
   an information acquiring unit for acquiring state information indicating a state related to said vehicle;
   a storage unit for storing a plurality of pieces of said state information as respective learned data;
   a learning unit, by using said learned data, for constructing a probabilistic model into which said state information is entered in order to calculate the probability of a vehicle occupant performing a specific setting operation;
   a control information correcting unit for calculating said probability by entering said state information into the probabilistic model constructed by said learning unit, and for correcting setting information or control information related to the setting operation of said occupant in accordance with said calculated probability so as to achieve said specific setting operation; and
   an air-conditioning control unit for controlling said air-conditioning unit in accordance with said corrected setting information or control information, wherein
   said learning unit comprises:
   a clustering subunit for classifying said plurality of learned data stored in said storage unit into at least a first cluster and a second cluster, and for determining a first range for a value of said state information from the learned data included in said first cluster and a second range for the value of said state information from the learned data included in said second cluster; and
   a probabilistic model constructing subunit for constructing said probabilistic model associated with said specific setting operation by determining the probability of occurrence of the value of said state information contained in said first range and the probability of occurrence of the value of said state information contained in said second range.

2. The automotive air conditioner according to claim 1, wherein said clustering subunit has a first clustering condition and a second clustering condition that define different ranges for the value of said state information, and generates said clusters after determining the ranges of the clusters to which said respective learned data belong by using said plurality of learned data and said first and second clustering conditions.

3. The automotive air conditioner according to claim 2, wherein the ranges for the value of said state information are each determined based on a Euclidean distance,
   said first clustering condition is that the Euclidean distance between each pair of learned data in said plurality of learned data is not greater than a first Euclidean distance, and
   said second clustering condition is that the Euclidean distance between each pair of learned data in said plurality of learned data is greater than said first Euclidean distance but not greater than a second Euclidean distance.

4. The automotive air conditioner according to claim 1, wherein said clustering subunit determines said first range so as to contain all of said learned data included in said first cluster but not to contain any learned data included in said second cluster, and determines said second range so as to contain all of said learned data included in said second cluster but not to contain any learned data included in said first cluster.

5. The automotive air conditioner according to claim 1, wherein said clustering subunit determines said first range for the value of said state information so as to be defined by an area whose center is located at the centroid of said learned data included in said first cluster and whose radius is defined by the Euclidean distance from said centroid to the learned data located farthest away therefrom among said learned data included in said first cluster.

6. The automotive air conditioner according to claim 1, wherein said probabilistic model has a node that takes said state information as an input and that outputs the probability of said occupant performing said specific setting operation, and said node has a conditional probability table that indicates said probability for the case where the value of said state information is contained in said first range as well as for the case where the value of said state information is contained in said second range, and
   said probabilistic model constructing subunit obtains from said plurality of learned data the number of times that said specific setting operation has been performed for the case where the value of said state information is contained in said first range as well as for the case where the value of said state information is contained in said second range, creates said conditional probability table by dividing said number of times by the total number of said plurality of learned data and thereby obtaining said recommended probability for the case where the value of said state information is contained in said first range as well as for the case where the value of said state information is contained in said second range, and stores said conditional probability table in said storage unit by associating said conditional probability table with said node.

7. The automotive air conditioner according to claim 1, wherein said probabilistic model has a group of nodes consisting of a node that takes said state information as an input and that outputs a conditional probability of a specific event and at least one other node that takes the output of said node as an input and that outputs the probability of said occupant performing said specific setting operation, and said node has a conditional probability table that indicates said conditional probability for the case where the value of said state information is contained in said first range as well as for the case where the value of said state information is contained in said second range, and said probabilistic model constructing subunit obtains from said plurality of learned data the number of times that said specific even has occurred for the case where the value of said state information is contained in said first range as well as for the case where the value of said state information is contained in said second range, creates said conditional probability table by dividing said number of times by the total number of said plurality of learned data and thereby obtaining said conditional probability for the case where the value of said state information is contained in said first range as well as for the case where the value of said state information is contained in said second range, and stores said conditional probability table in said storage unit by associating said conditional probability table with said node.

8. The automotive air conditioner according to claim 1, wherein said state information is said vehicle's current location information.

9. The automotive air conditioner according to claim 1, wherein said state information is time information indicating current time.

10. The automotive air conditioner according to claim 1, wherein said state information is said vehicle's current location information combined with time information indicating current time.

11. A method for controlling an automotive air conditioner, said air conditioner comprising an air-conditioning unit for supplying conditioned air into a vehicle, an information acquiring unit for acquiring state information indicating a state related to said vehicle, a storage unit, a control information correcting unit for having at least one probabilistic model associated with a specific setting operation, calculating the probability of said specific operation by entering said state information into said probabilistic model, and correcting setting information or control information related to the setting operation of a vehicle occupant in accordance with said calculated probability so as to achieve said specific setting operation, and an air-conditioning control unit for controlling said air-conditioning unit in accordance with said corrected setting information or control information, the method comprising:

storing said state information as learned information in said storage unit;

selecting a plurality of learned data from said learned data stored in said storage unit;

classifying said plurality of learned data stored in said storage unit into at least a first cluster and a second cluster, and determining a first range for a value of said state information from the learned data included in said first cluster and a second range for the value of said state information from the learned data included in said second cluster; and constructing said probabilistic model associated with said specific setting operation by determining the probability of occurrence of said state information contained in said first range and the probability of occurrence of said state information contained in said second range.

12. The method according to claim 11, wherein each time said specific setting operation is performed, said storing said state information stores said state information in said storage unit as the learned data related to said specific setting operation.

13. The method according to claim 11, wherein when the number of times that said specific setting operation has been performed reaches a predetermined number of times, said selecting a plurality of learned data selects said plurality of learned data related to said specific setting operation.

14. The method according to claim 11, wherein when a predetermined time period has elapsed after the construction of said probabilistic model associated with said specific setting operation, said selecting a plurality of learned data selects said plurality of learned data related to said specific setting operation in order to construct another probabilistic model associated with said specific setting operation.

15. The method according to claim 11, wherein said classifying said plurality of learned data generates said clusters after determining the ranges of the clusters to which said respective learned data belong by using said plurality of learned data and also using a first clustering condition and a second clustering condition that define different ranges for the value of said state information.

16. The method according to claim 11, wherein the ranges for the value of said state information are each determined based on a Euclidean distance, said first clustering condition is that the Euclidean distance between each pair of learned data in said plurality of learned data is not greater than a first Euclidean distance, and said second clustering condition is that the Euclidean distance between each pair of learned data in said plurality of learned data is greater than said first Euclidean distance but not greater than a second Euclidean distance.

* * * * *